(12) United States Patent
Okita et al.

(10) Patent No.: US 7,739,325 B1
(45) Date of Patent: Jun. 15, 2010

(54) APPARATUS AND METHOD FOR EXTENSIBLE REAL-TIME WORKFLOWS

(75) Inventors: Glen Kazumi Okita, San Jose, CA (US); Suresh Kumar Agarwal, Sunnyvale, CA (US); Alex Yiu-Man Chan, Sunnyvale, CA (US); Roy Sing Ho, San Jose, CA (US); Stanley Ka-Hung Poon, Milpitas, CA (US); Fung-Wah Lin, Redwood City, CA (US); Binu Thomas, San Jose, CA (US)

(73) Assignee: Aspect Software, Inc., Lombard, IL (US)

( * ) Notice: Subject to any disclaimer, the term of this patent is extended or adjusted under 35 U.S.C. 154(b) by 0 days.

(21) Appl. No.: 09/557,334

(22) Filed: Apr. 24, 2000

(51) Int. Cl.
G06F 15/16 (2006.01)

(52) U.S. Cl. .............................. 709/200; 707/8; 707/9; 707/100

(58) Field of Classification Search ............. 707/103 R, 707/9, 8, 100; 705/9; 714/38; 719/316, 719/318; 709/202, 200; 717/102; 345/629, 345/630
See application file for complete search history.

(56) References Cited

U.S. PATENT DOCUMENTS

| | | | |
|---|---|---|---|
| 4,328,556 A | 5/1982 | Abe et al. | |
| 4,885,694 A | 12/1989 | Pray et al. | |
| 5,040,227 A | 8/1991 | Lyke et al. | |
| 5,095,221 A | 3/1992 | Tyler | |
| 5,129,057 A | 7/1992 | Strope et al. | |
| 5,185,861 A | 2/1993 | Valencia | |
| 5,214,756 A | 5/1993 | Franklin et al. | |
| 5,301,301 A | 4/1994 | Kodosky et al. | |
| 5,323,452 A | 6/1994 | Dickman et al. | |
| 5,367,624 A | 11/1994 | Cooper | |
| 5,404,523 A | 4/1995 | DellaFera et al. | |
| 5,455,854 A | 10/1995 | Dilts et al. | |
| 5,455,903 A | 10/1995 | Jolissaint et al. | |
| 5,533,110 A | 7/1996 | Pinard et al. | |
| 5,535,322 A | 7/1996 | Hecht | |
| 5,555,179 A | 9/1996 | Koyama et al. | |
| 5,576,946 A | 11/1996 | Bender et al. | |
| 5,586,312 A | 12/1996 | Johnson et al. | |
| 5,623,541 A | 4/1997 | Boyle | |

(Continued)

OTHER PUBLICATIONS

"A Mitem View Customer Reference", http://www.mitem.com/resources/caseStudies/pdfs/norwest.pdf, Norwest Mortage, Inc., (1996-1999), 2 pgs.

(Continued)

*Primary Examiner*—William C Vaughn, Jr.
*Assistant Examiner*—Mohamed Ibrahim
(74) *Attorney, Agent, or Firm*—Husch Blackwell Sanders Welsh Katz

(57) ABSTRACT

A method and apparatus for extensible real-time workflows are described. The present invention allows a user of a transaction processing system, such as a customer relationship management (CRM) tool or an automatic call distribution (ACD), for example, to easily add new event sources without recompiling the core workflow server engine of the transaction processing system. The invention also supports features such as the adding of new services, the exchange of events and parameters with other systems, real-time collection and display of workflow statistical information, the use of a centralized configuration database, incremental loading and unloading of workflows and rules, and exception handling.

24 Claims, 14 Drawing Sheets

U.S. PATENT DOCUMENTS

| | | | |
|---|---|---|---|
| 5,644,728 | A | 7/1997 | Pillans |
| 5,649,131 | A | 7/1997 | Ackerman et al. |
| 5,664,129 | A | 9/1997 | Futatsugi |
| 5,734,837 | A * | 3/1998 | Flores et al. ............ 705/7 |
| 5,742,814 | A | 4/1998 | Balasa et al. |
| 5,745,763 | A | 4/1998 | Mealey et al. |
| 5,754,636 | A | 5/1998 | Bayless et al. |
| 5,765,033 | A | 6/1998 | Miloslavsky |
| 5,799,297 | A | 8/1998 | Goodridge et al. |
| 5,812,989 | A | 9/1998 | Witt et al. |
| 5,831,611 | A | 11/1998 | Kennedy et al. |
| 5,835,898 | A | 11/1998 | Borg et al. |
| 5,848,393 | A | 12/1998 | Goodridge et al. |
| 5,903,730 | A | 5/1999 | Asai et al. |
| 5,905,493 | A | 5/1999 | Belzer et al. |
| 5,918,226 | A | 6/1999 | Tarumi et al. |
| 5,926,539 | A | 7/1999 | Shtivelman |
| 5,940,804 | A | 8/1999 | Turley et al. |
| 5,946,387 | A | 8/1999 | Miloslavsky |
| 5,953,332 | A | 9/1999 | Miloslavsky |
| 5,953,405 | A | 9/1999 | Miloslavsky |
| 5,999,911 | A * | 12/1999 | Berg et al. ............ 705/9 |
| 5,999,965 | A | 12/1999 | Kelly |
| 6,002,760 | A | 12/1999 | Gisby |
| 6,021,428 | A | 2/2000 | Miloslavsky |
| 6,028,997 | A * | 2/2000 | Leymann et al. ............ 717/104 |
| 6,044,145 | A | 3/2000 | Kelly et al. |
| 6,044,368 | A | 3/2000 | Powers |
| 6,052,684 | A | 4/2000 | Du |
| 6,067,357 | A | 5/2000 | Kishinsky et al. |
| 6,078,982 | A * | 6/2000 | Du et al. ............ 710/200 |
| 6,105,053 | A | 8/2000 | Kimmel et al. |
| 6,108,711 | A | 8/2000 | Beck et al. |
| 6,138,139 | A | 10/2000 | Beck et al. |
| 6,167,395 | A | 12/2000 | Beck et al. |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,192,121 | B1 | 2/2001 | Atkinson et al. |
| 6,222,530 | B1 | 4/2001 | Sequeira |
| 6,226,377 | B1 | 5/2001 | Donaghue, Jr. |
| 6,233,537 | B1 * | 5/2001 | Gryphon et al. ............ 703/1 |
| 6,243,092 | B1 | 6/2001 | Okita et al. |
| 6,243,105 | B1 | 6/2001 | Hoyer et al. |
| 6,263,359 | B1 | 7/2001 | Fong et al. |
| 6,279,009 | B1 * | 8/2001 | Smirnov et al. ......... 707/103 R |
| 6,289,369 | B1 | 9/2001 | Sundaresan |
| 6,314,089 | B1 | 11/2001 | Szlam |
| 6,324,681 | B1 * | 11/2001 | Sebesta et al. ............ 717/102 |
| 6,345,305 | B1 | 2/2002 | Beck et al. |
| 6,351,778 | B1 | 2/2002 | Orton et al. |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,411,982 | B2 | 6/2002 | Williams |
| 6,418,458 | B1 | 7/2002 | Maresco |
| 6,434,590 | B1 | 8/2002 | Blelloch et al. |
| 6,442,620 | B1 * | 8/2002 | Thatte et al. ............ 719/316 |
| 6,519,601 | B1 * | 2/2003 | Bosch ............ 707/100 |
| 6,606,740 | B1 * | 8/2003 | Lynn et al. ............ 717/100 |
| 6,658,447 | B2 | 12/2003 | Cota-Robles |
| 6,675,261 | B2 * | 1/2004 | Shandony ............ 711/121 |
| 6,721,778 | B1 | 4/2004 | Smith et al. |
| 6,732,156 | B2 | 5/2004 | Miloslavsky |
| 6,748,555 | B1 * | 6/2004 | Teegan et al. ............ 714/38 |
| 6,826,579 | B1 * | 11/2004 | Leymann et al. ............ 717/131 |
| 6,829,770 | B1 * | 12/2004 | Hinson et al. ............ 719/318 |
| 7,221,377 | B1 * | 5/2007 | Okita et al. ............ 345/629 |
| 2002/0065752 | A1 | 5/2002 | Lewis |
| 2002/0156814 | A1 | 10/2002 | Ho |
| 2003/0115545 | A1 | 6/2003 | Hull et al. |

OTHER PUBLICATIONS

Edstrom, D., et al., "CETI Operations and Support Plan—Draft", http://www.csufresno.edu/alt/ceti/tech/ops1210.html; *paper prepared by Operations and Support Team, D. Edstrom et al co-leaders*, (Dec. 10, 1997),75 pgs.

Farhooi, F., et al., "Competing for the Future with Intellegent Agents", http://home1.gte.net/pfingar/agents_doc_rev4.htm; *Distributed Object Computing. "DOC" Magazine, the endorsed publication of the Object Management Group*, part 1, Oct. 1997—part 2. Nov. 1997, (1997),10 pgs.

Pan, Alex, "IT Architect—Enterprise Application Integration—Message Broker Style—pointers on evaluation and integration", http://sunsite.uakom.sk/sunworidonline/swol-08-itarchitect.htm; *Sunworld* Sep. 1999, (1999).

Peter, Fingar, "Intelligent Agents: The Key to Open eCommerce", http://home1.gte.net/pfingar/csAPR99.html; *Component Strategies* Apr. 1999, (Apr. 1999).

Scacchi, W., "Experience with Software Process Simulation and Modeling", http://www.usc.edu/dept/ATRIUM/Papers/JSS98/JSS98.htm; *Walter Scacchi, Atrium Laboratory,University of Southern California, Presented at ProSim 98*, Silver Falls Oreton, Jun. 22-24. 1998, (Jun. 1998).

Edify, "How EWF Works", Date Unknown, 4 pages, http://www.edify.com/customer/edify_products/how_ewf_works.html.

FileNET, "Visual Workflow", Date Unknown, 6 pages http://www.filenet.com/Products/visualWrkflw/Visual_WorkFlo.pdf.

InConcert, Inc., "InConcert v3.6 Product Data Sheet", Date Unknown, 6 pages http://www.inconcert.com/products/inconcert36/datasheet.html.

Aspect Communications, "Aspect Customer Self Service", Date Unknown, 3 pages http://www.aspect.com/products/portal_apps/css/css.htm.

InterVoiceBright, "InVision Application Development Environment", Date Unknown, 2 pages http://www.intervoice.com/products/solutions/pdf/gen-ivsn.pdf.

InterVoiceBright, "InVision—Advanced Call Flow Development Tool", Date Unknown, 1 pages http://www.intervoice.com/products/solutions/development/invision.html.

Prima, "OPUS Maestro—Technology Facilitator", Date Unknown, 4 pages http://www.prima.ca/english/products/OpusMaestro_overview.htm.

Prima, "OPUS Composer—The Ideal Tool for Rapidly Creating Highly Adaptive Interactive Communications Server", Date Unknown, 3 pages http://www.prima.ca/english/products/OpusComposer.htm.

Brooktrout Software, "Show N Tel Features", Date Unknown, 2 pages http://www.brooksoft.com/pages/products/show_n_tel/features.html.

InConcert, Inc., "InConcert v3.6 Product Data Sheet", 1999, 6 pages http://www.inconcert.com/products/inconcert36/datasheet.html.

InfoNet, One IDIA member's intranet/internet use, Apr. 1999, InfoNet, Newsletter of the International Imaging Association, p. 2 and 3 [online], [retrieved on Nov. 21, 2002], Retrieved from the Internet <URL: http://www.dxp.dk/download/pfd/cases/idia.pdf>.

DOT (Department Of Transportation), Pennsylvania Official Transportation and Tourism Map, 1997, Department of Transportation.

Baresi, L , et al., "Wide Workflow Development Methodology (online)", *International Conference on Work activities Coordination and Collaboration*, (Mar. 3, 1999),1, 27, 28, 36-54.

Imielinski, Tomasz , et al., "GPS-based geographic addressing, routing, and resource discovery", *Communications of the ACM*, 42(4), (Apr. 1999),86-92.

Microsoft Corporation, "Microsoft Project", *Business Project Planning System Version 4.0 for Windows 3.1*, (1995),207.

Microsoft Corporation, "Microsoft Project for Window", *Reference—Business Project Planning System. Version 1.0*, (1990),86-89, 137, 260, 288-89.

* cited by examiner

APPARATUS AND METHOD FOR EXTENSIBLE REAL-TIME WORKFLOWS

FIELD OF THE INVENTION

This invention relates to the field of transaction processing. In particular, this invention is drawn to a system for executing workflows that is extensible so that new event sources can be added without recompiling the core workflow server engine.

BACKGROUND OF THE INVENTION

In a transaction processing system, the system is capable of managing various tasks, including transaction routing, such as telephone call routing, e-mail routing, web request routing, etc. A typical transaction processing system is equipped to receive transaction requests, or events (e.g., calls, e-mails, network requests, etc.) over a variety of media, and to process and facilitate transactions between the source of the event and an agent responsive to such a request.

For each type of event for which the transaction processing system is equipped to respond, one or more administrative clients is configured with workflow definitions that define workflows that are executed by one or more workflow server engines. In this way, when a pre-defined event is received by the transaction processing system, the transaction processing system executes a workflow which has been previously configured.

One problem with prior art transaction processing systems relates to the difficulty in handling new types of events. When a transaction processing system is set up, it is capable of handling various types of events and executing workflows in response to the events. However, if the user of the transaction processing system wants to add another type of event and have the transaction processing system respond to the new type of event by executing a workflow, the core workflow server engine must be recompiled. As a result, the transaction processing system is inflexible and can not be customized very easily. It would be desirable to provide a transaction processing system which is extensible so that new kinds of events can be handled without changing the core workflow execution method.

SUMMARY OF THE INVENTION

A method of the present invention is provided for adding an event source to a transaction processing system having a workflow server engine including the steps of defining the event in a workflow database, creating one or more executable functions which creates a data structure for events coming from the event source, and creating a workflow to be executed on the workflow server engine in response to an event from the event source.

One embodiment provides a method of adding a new subsystem to a workflow server engine having a plurality of subsystems for providing events to the workflow server engine including the steps of defining an event which will be generated by the new subsystem, creating a dynamic link library for creating a data structure for the defined event, and associating the defined event with a workflow so that the associated workflow is executed on the workflow server engine in response to an event from the new subsystem.

Another embodiment provides an apparatus for executing a transaction task within a transaction processing system including a plurality of event providers for providing a source of events to the transaction processing system, a database for storing information relating to the events provided by the event providers, a workflow server engine for executing workflows in response to events from the plurality of event providers, and a workflow editor for creating and editing workflows to be executed on the workflow server engine.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for providing extensible real-time workflows are described. Generally, the present invention allows a user of a transaction processing system, such as a customer relationship management (CRM) tool or an automatic call distribution (ACD), for example, to easily add new event sources without recompiling the core workflow server engine of the transaction processing system. The invention uses standards-based, extensible components (e.g., ActiveX controls), which makes the implementation of the invention advantageous over prior art systems (described in detail below). In the following description, for the purposes of explanation, numerous specific details are set forth in order to provide a thorough understanding of the present invention. It will be evident, however, to one skilled in the art that the present invention may be practiced without these specific details.

For the purposes of this description, the term "workflow" is intended to mean a sequence of steps that are performed to, at least partially, process a transaction. In other words, "workflow" is intended to designate a form of business rule processing.

Generally, workflows are directed graphs having a plurality of vertices (steps) connected to each other with edges (connectors) to symbolically depict business rules and how the business rules handle events and other inputs. Workflows are created using a workflow editor which is described below. Workflows are stored in some sort of file system or database for use by a workflow server engine. Workflows are typically associated with one or more events from a given event source, thereby allowing a workflow designer the choice of using event parameters in the business logic.

To better understand the present invention, an exemplary transaction processing system will be described. It should be understood that the present invention can be implemented with other types of transaction processing systems. A more detailed description of a transaction processing system and a workflow server is described in commonly-owned co-pending patent application entitled "METHOD AND APPARATUS FOR EXECUTING A TRANSACTION TASK WITHIN A TRANSACTION PROCESSING SYSTEM EMPLOYING SYMMETRIC MULTIPROCESSORS", filed on May 26, 1999, and incorporated by reference herein.

Figure 1:
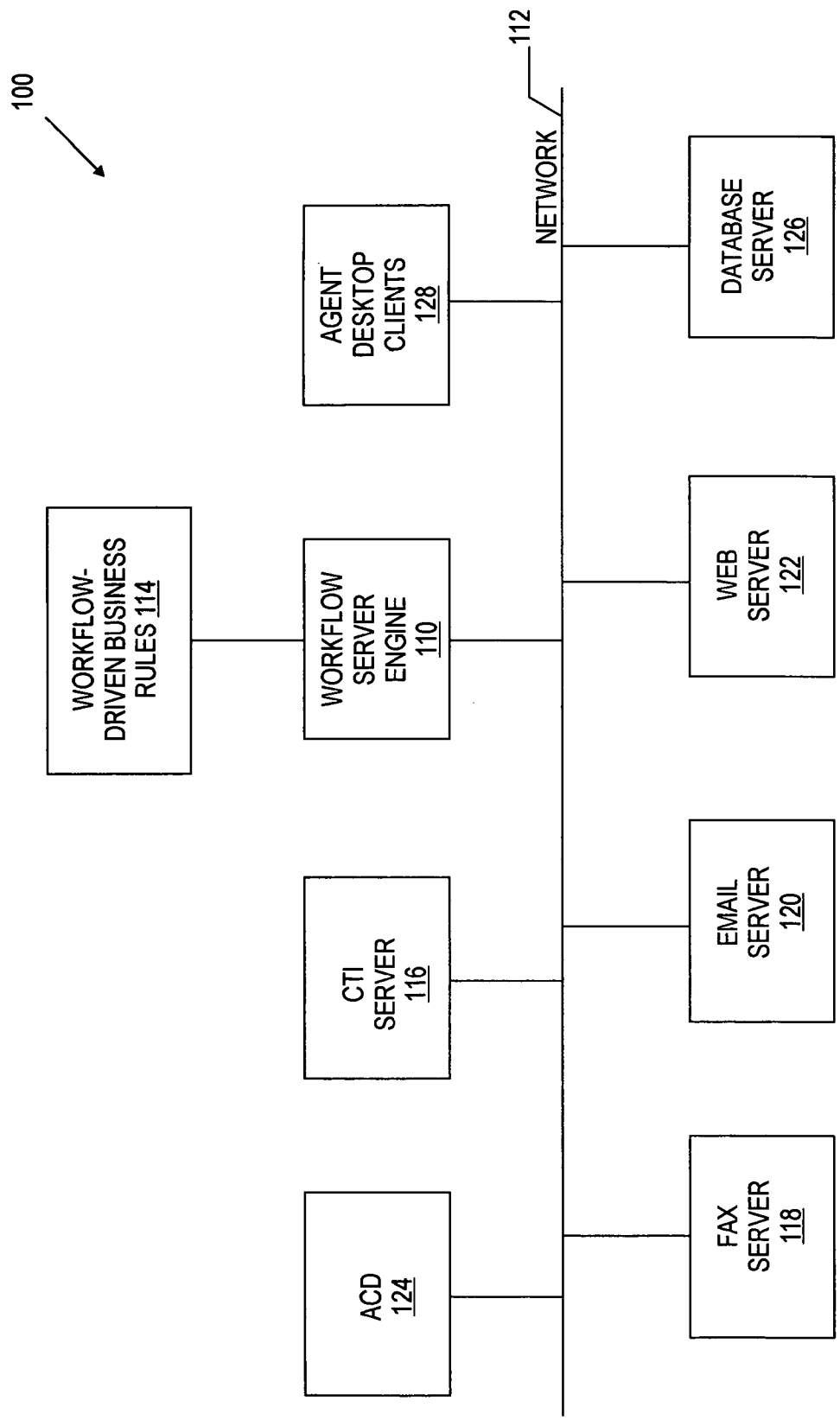
FIG. 1 is a block diagram illustrating a transaction processing system environment.

FIG. 1 is a block diagram illustrating a transaction processing system environment 100 including a workflow server engine 110 connected to a network 112. The network 112 could be comprised of any suitable network such as a LAN, WAN, MAN, etc. The function of the workflow server engine 110 is to execute transaction tasks, in response to an event, using workflow-driven business rules 114. Sources of events are provided by several systems including CTI server 116, fax server 118, email server 120, and web server 122. As described below, other types of event sources may also provide sources for events. FIG. 1 also shows an automatic call distributor (ACD) 124 and a database server 126 connected to the network 112. One or more agent desktop clients 128 are also connected to the network 112. When an event is received from one or more of the event sources, the workflow server engine 110 responds to the event based on the workflow-driven business rules 114. Depending on the business rules, the response may include various steps including routing a query to one of the agent desktop clients 128, automatically responding to the event, etc. The workflow-driven business rules 114 may be a simple process or may be a complex process with multiple steps and the exchange of information between the workflow server engine 110 and the event source. To help understand the present invention, following is a more detailed description of the operation of the workflow server engine 110.

A transaction processing system of the present invention, such as for example an ACD, is used for executing a transaction task. The transaction processing subsystem may be dedicated to performing a specific task within the transaction processing system, such as for example transaction routing. Examples of transaction routing include telephone routing, e-mail routing, and Web request routing from an event source to a software or human agent.

Figure 2:
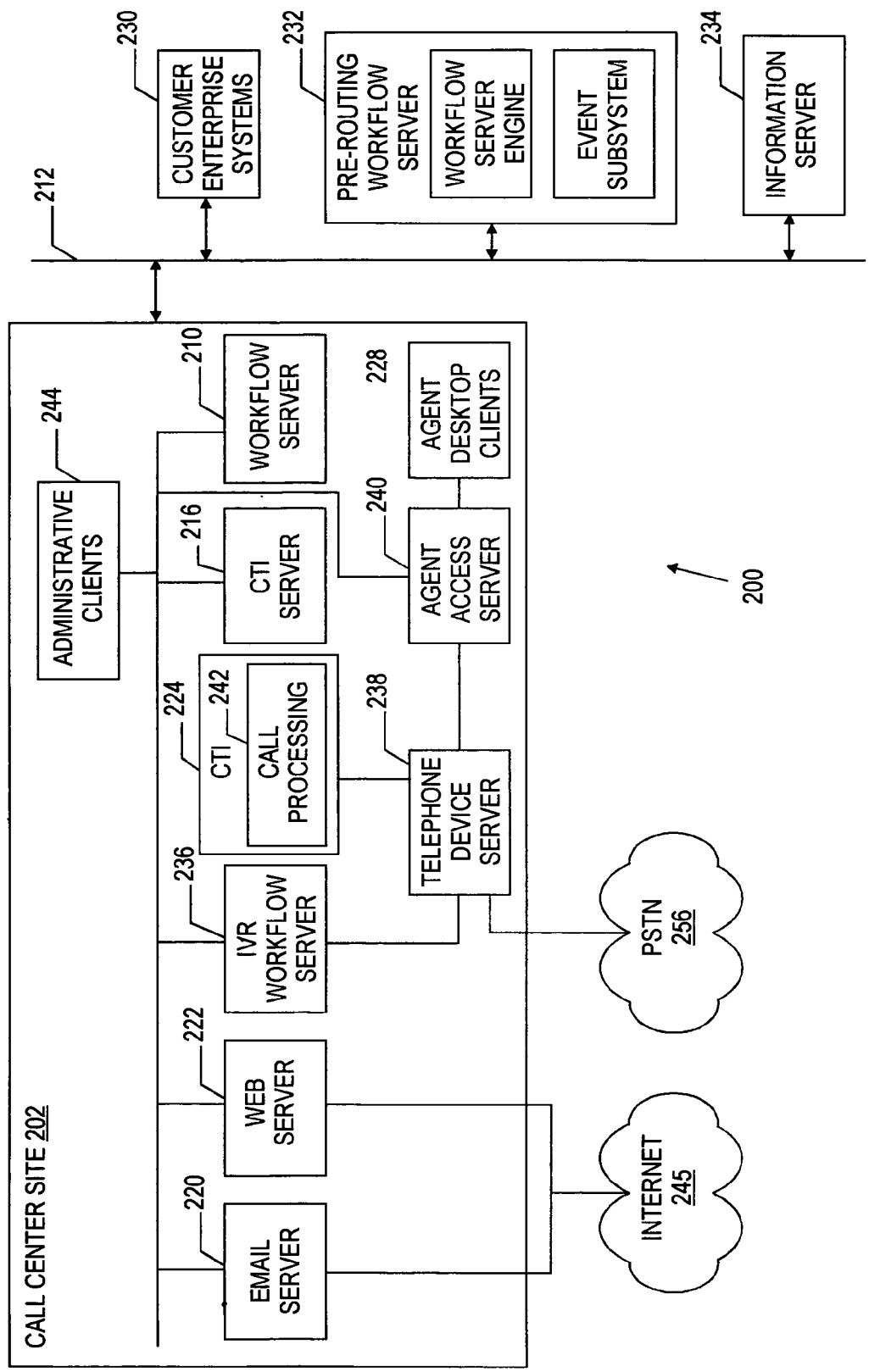
FIG. 2 is a block diagram illustrating an exemplary transaction processing environment in the form of a call center environment.

FIG. 2 is a block diagram illustrating an exemplary transaction processing environment 200, in the form of a call center environment. Specifically, FIG. 2 provides an enterprise-wide view of a transaction processing environment 200 that includes a call center site 202 that may be coupled via a network 212 and to customer enterprise systems 230, an enterprise workflow server 232, and an information server 234. The customer enterprise systems 230 may execute host-based Computer Telephony Integration (CTI) applications, such as "screen pops" and database lookup applications. The pre-routing workflow server 232 may perform a "pre-call routing" function. Merely for example, the workflow server 232 may collect information from multiple call center sites in a multi-site heterogeneous or homogeneous call center environment, interpret this information, and provide routing information to a Service Control Point (SCP) regarding where to route a call based on the call center site data and user preferences. Accordingly, the workflow server 232 provides a framework for a single system image view of resources on multiple call center sites, and the capability to route a call to a specific call center site based on resources, skills and agent availability at the multiple call center sites. Such routing decisions may be based on near real-time data collected from the respective call center sites, and on the routing preferences specified by users. The information server 234 also provides real-time and enterprise-wide information to call center system administrator, and may also gather information for the purposes of near real-time management of the call center environment shown in FIG. 2.

The call center site 202 is equipped to receive transaction requests (e.g., calls, e-mails, network requests, etc.) over a variety of media, and to process and facilitate transactions between, for example, a source and a human (or software) agent responsive to such transaction requests. To this end, the call center site 202 is shown to include a number of transaction processing systems, namely an e-mail server 220, a web server 222, an Interactive Voice Response (IVR) workflow server 236, an ACD 224, a Computer Telephony Integration (CTI) server 216 and a workflow server 210. The call center site 202 is also shown to include a telephony device server 238, an agent access server 240 and agent desktop clients 228. The ACD 224 is also shown to include call processing functionality 242, whereby telephone calls (e.g., both switched and voice-over-IP calls) may be processed and routed to an available agent teleset (not shown).

The call center site 202 includes a number of administrative clients 244, whereby a call center site administrator may configure and edit workflow definitions that define workflows that are executed by various workflow servers within the respective call center sites. A detailed description describing how workflow definitions can be edited is described in commonly-owned co-pending patent application entitled "VISUAL DESIGN OF WORKFLOWS FOR TRANSACTION PROCESSING", filed on Dec. 2, 1997, and incorporated by reference herein.

Figure 3:
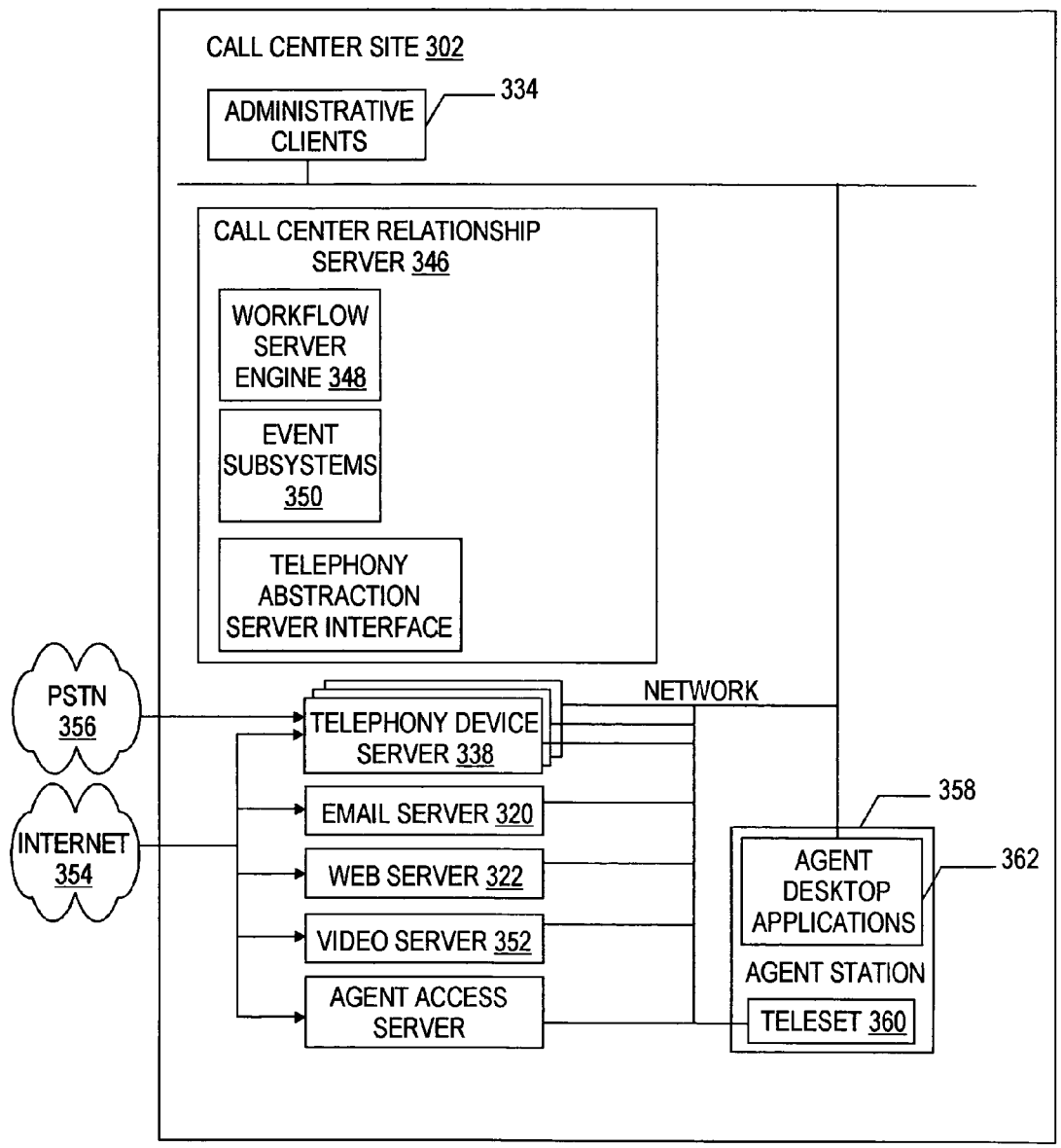
FIG. 3 is a block diagram illustrating a call center site having an alternative architecture.

FIG. 3 is a block diagram illustrating a call center site 302, according to an exemplary embodiment of the present invention, having an alternative architecture to the call center site 202 illustrated in FIG. 2. Specifically, the workflow server engines for directing and routing calls within an environment which has multiple call center sites (such as call center site 202 of FIG. 2) are shown to be distributed over a number of transaction processing systems, such as the workflow server 210, the IVR workflow server 236, a call center customer relationship server 346, and the CTI server 216. The call center site 302 illustrated in FIG. 3 provides a more integrated environment in which a single workflow server engine 348 within the server 346 routes transaction information over a wide variety of media. The workflow server engine 348 is a provided with "events" by a number of event subsystems 350 that receive input from a number of servers, such as for example in the e-mail server 320, the web server 322, and a video server 352. The event subsystem 350 also provides events to the workflow server engine 348 resulting from telephone calls received at a telephony device server 338 via the Public Switched Telephone Network (PSTN) 356 or via the Internet 354.

The call center site 302 includes a number of agent stations 358, each of which may include a teleset 360 by which a human agent may respond to transaction requests received via any of the media servers and a collection of agent desktop applications 362 for facilitating transaction processing over, for example, the Internet utilizing e-mail or the World Wide Web (WWW). For example, the agent desktop applications 362 may include an e-mail client, a browser client, a web collaboration client and a video conferencing client. These agent desktop applications may be highly integrated, or may be stand-alone applications. Alternatively, each agent station 358 may comprise a software agent, which is able to respond to transaction requests, and process a transaction to completion, in an automated fashion.

Figure 4:
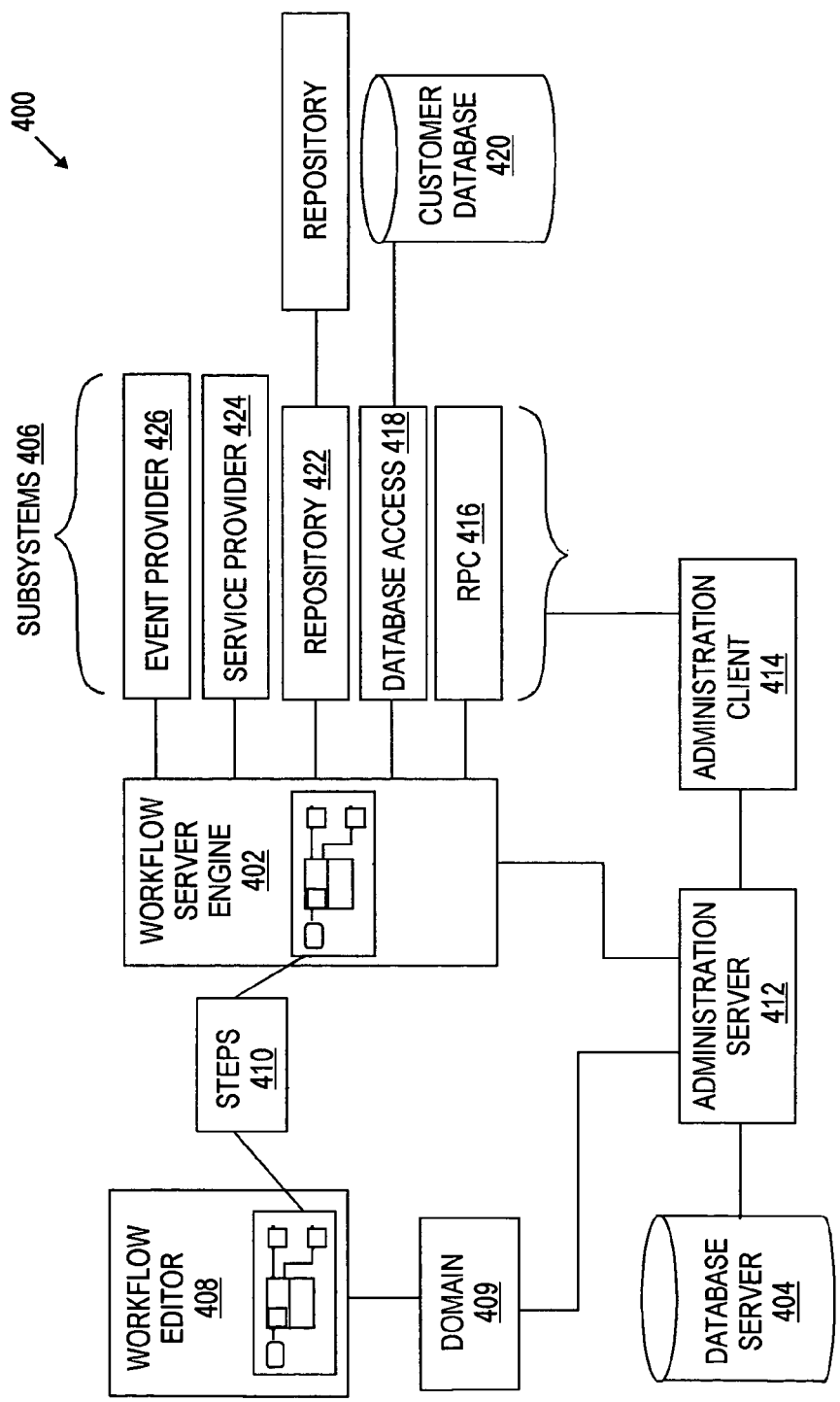
FIG. 4 is a block diagram of a workflow server of the present invention.
Figure 6:
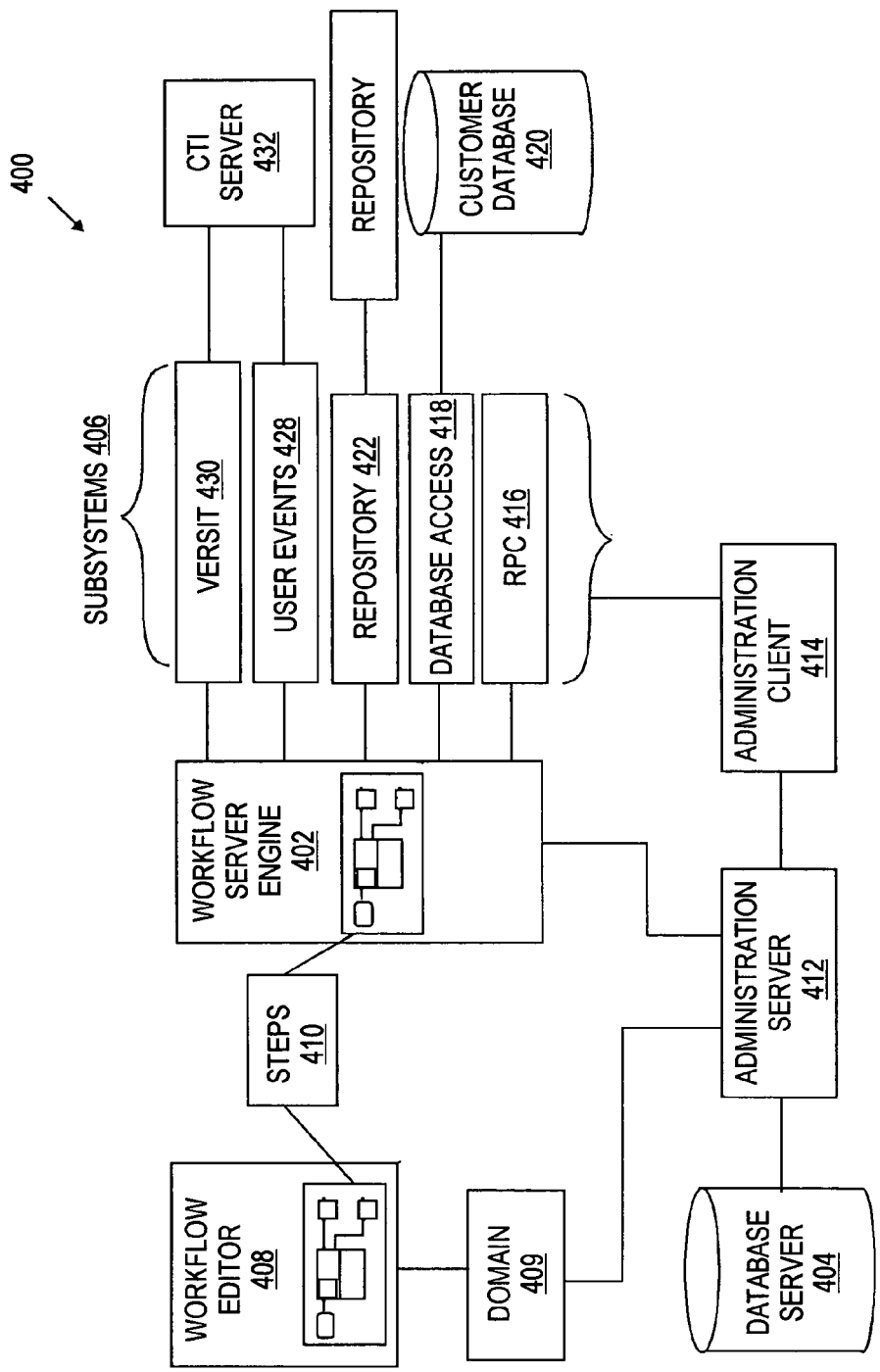
FIGS. 6 and 7 are block diagrams of workflow servers of the present invention.
Figure 7:
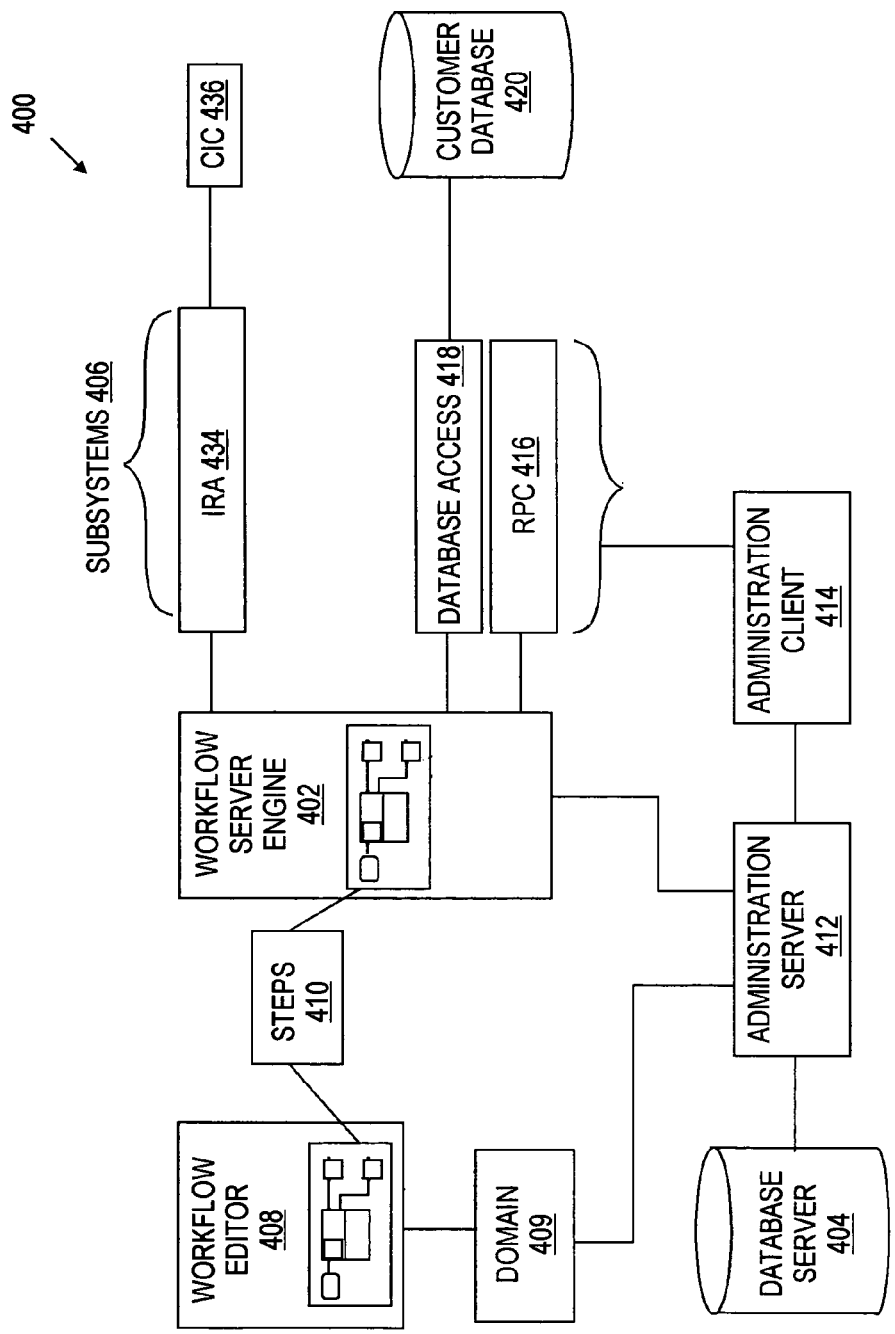

FIGS. 4, 6, and 7 are block diagrams illustrating workflow servers according to exemplary embodiments of the present invention, that may be used with the transaction processing systems described above.

FIG. 4 illustrates a workflow server 400 including a workflow server engine 402 and a database server 404. The workflow server engine 402 is shown connected to a number of event subsystems 406 (also termed "event providers") that generate tasks responsive to external transaction occurrences that are communicated to the event subsystems 406 as messages from appropriate clients. Such tasks may be any task required for the facilitating of a transaction and for fulfilling system requirements within a transaction processing system. While such tasks are described below in the context of routing tasks (for routing a transaction to an agent), the tasks could include data storage and retrieval tasks that store and retrieve data pertinent to the transaction. The tasks may also include tasks that facilitate interaction with agents, such as "screen pop" generation. Tasks may also include reporting, maintenance or system administration tasks. Transaction occurrences may include, for example, the receipt of a transaction request (e.g., an e-mail or telephone call), the termination of a transaction by a source (e.g., a client hangs up prior to a queued telephone call being serviced), or a system failure or shutdown for some other reason.

Each of the event subsystems 406 calls a task dispatcher (not shown) that is responsible for creating a task object, or set of task objects that may be executed by the workflow server engine in response to an event from the event subsystem. The tasks are created responsive to reception of an event generated by the relevant subsystem. Specifically, if an event invokes a workflow, a task dispatcher creates a task object for execution. The task dispatcher accesses workflow definitions, event definitions, and event-workflow rule information, which are stored within the database server 404.

FIG. 4 also shows a workflow editor 408 which is used to create and edit workflows for use by the workflow server engine 402. As mentioned above, a detailed description of a suitable workflow editor 408 can be found in the referenced description. The workflow editor 408 provides steps 410 to the workflow server engine 402 for whatever workflow is being executed (in response to an event). The steps 410 may be comprised of component object model (COM) objects, ActiveX controls or similar objects. FIG. 4 also shows domain 409 connected to the workflow editor 408. The purpose of the domain 409 is to determine how the visual representation of the workflows get expressed as the actual underlying logic. Note that the domain can be replaced with different functions in different environments. The workflow server engine 402, workflow editor 408, and database server 404 are connected to an administration server 412 which provides a link between the database 404 and these systems via a database interface (not shown). The administration server 412 serves as a repository for data objects created and managed by the workflow system. The administration server 412 is also connected to an administration client 414 for providing an interface to the subsystems 406.

FIG. 4 shows various subsystems 406 which are each described below. Each of the event subsystems 406 generates events by calling an event generator routine provided by the workflow server engine 402. Each of the event subsystems 406 furthermore includes a unique subsystem identifier (id). An exemplary event that may be generated by any one of the event subsystems 406 includes an event id, a subsystem identifier identifying the subsystem that generated the event, and a property list. The property list is a set of variables or parameters represented as name-value pairs. The database server 404 includes a list of all event definitions (described below).

The subsystems 406 shown in FIG. 4 include a remote procedure call (RPC) 416 connected between the administration client 414 and the workflow server engine 402. The RPC 416 passes commands to the workflow server engine 402 from the administration client 414. These commands are passed to the workflow server engine 402 as a type of event. As a result, administrative tasks can be executed as well as customer business tasks. Since the subsystems are extensible, administrative tasks are extensible as well. Another subsystem shown in FIG. 4 is a database access subsystem 418 connected between the workflow server engine 402 and a customer database 420. A repository subsystem 422 is also shown connected to the workflow server engine 402. The repository subsystem 422 keeps track of transient relationship data (such as account numbers, etc.).

FIG. 4 also shows service provider 424 and event provider 426 subsystems which can be plugged into the system. Note that FIG. 4 only shows a few subsystems, although many subsystems can be plugged into the system. The workflow server of the present invention is an open-ended system. When a user of the system desires to add services or subsystems to handle new event sources or customize the system in other ways, the invention allows this without changing the core workflow execution method. The addition of new services is described below. Briefly, a new event source can be added by defining the event structure, creating a subsystem dynamic link library (DLL), and creating a workflow (if one does not already exist). Note that the step of creating a workflow is not required to add a new event source, although no events will be processed by the workflow server engine if there are no workflows or event rules to handle the new event. These steps can be performed in any suitable order. New event sources can comprise anything that a user desires a workflow to respond to. For example, any type of media can be used as a new event source. Also, as mentioned above, administrative tasks can be executed in response to an event. Events can also come from within the transaction processing system. For example, when an agent becomes available, logic can be executed that determines what tasks are best suited to be routed to the agent.

As mentioned above, a first step to adding an event source is to define the event structure for the new event source in a configuration database. While there are various ways of defining an event structure, one way is to make an entry in the database server 404. The database server 404 includes tables having a list of events including, for each defined event, a subsystem id, an event id, an event name, a list of event parameters (also know as "name-value pairs), etc. Each event parameter includes a name, data type, default value, and direction (e.g., input, output, or both). Example data types supported include long integer, double, string, datestamp, boolean, and binary blob. A parameter data type may also be a structured type, which contains nested name-value pairs. That is, a structure "A" may have nested fields "X", "Y", and "Z". The nested fields are addressed using standard dotted notation such as "A.Z". To add a new event to the database 404, a new entry can be added to the table including the information listed above.

The event representation of the present invention is general. In addition, the data associated with an event may include any number of parameters with a wide range of parameter types. This allows events for different applications to be processed by the workflow server engine in a uniform way. Therefore, new kinds of events may be handled without changing the core workflow execution method. In addition, the association of an event with a workflow is done via "rules". Following is a description illustrating how these rules work.

As mentioned above, events have various parameters associated with them. For example, an event resulting from a voice call may have Automatic Number Identification (ANI), Dialed Number Identification Service (DNIS), etc. as parameters, whereas an event resulting from an email may have the email addresses of the sender and receiver as parameters. When an event is received by an event handling subsystem, the subsystem notifies the workflow system about the event and as a part of the notification forwards the parameters associated with the event to the workflow server engine. The number of parameters that can be used in business logic for a given type of event is fixed and is stored in the configuration database. When a workflow is associated with an event, the workflow editor makes the event parameters appear in the variable pool of the workflow as input parameters and treats them like other user-defined variables.

The workflow system can handle new events by simply adding event-handling subsystems and by adding event parameters to the configuration database (described above). Note that this can be accomplished without re-building the workflow server engine or the editor. When a new event source is added, an expression is created based on the parameters and parameters associated with the new event. The new expression, or "rule" matches the event with the appropriate workflow. The expression or rule may take the form of a logic expression including operators such as ">", "<", "<=", "NOT", "AND", "if . . . then . . . else", etc. This methodology is very flexible since rule matching is not performed based on knowing what the event is in advance.

Another step required for adding an event source in this example is to create a DLL. A DLL may comprise a library of executable functions or data that can be used by an application. Note that the term "DLL" is not intended to be limited to DLL's used by Windows applications. Other types of applications may also be used with the present invention including, but not limited to, UNIX applications, Linix applications, Macintosh applications, etc. The DLL associated with the new event source is designed to create the message structure and send the events to the workflow server engine 402. The DLL in the preferred embodiment also calls a workflow server application program interface (API) entry which is designed to allow events to trigger workflows with the result returned to the event sources (via a "callback"). The callback is necessary so that the subsystem/event provider can clean up any internal data structures in the case of workflow failure or abort. The API creates and delivers the events. Following is an example of pseudo code for a typical event exchange:

On the event source side:
 Event=CreateEvent(Parameters);
 SendEvent(Event);
 Receive(Response);

On the workflow engine side:
 Receive(Event);
 Execute Workflow( )
 Reply(Response);

The final step in this example is to create a workflow which will be executed by the workflow server engine 402 in response to the new event form the event provider 426. The workflow is created using the workflow editor 408. As mentioned above, a detailed description of a suitable workflow editor is described in the reference description. The editor 408 allows a user to graphically create and edit workflows. The workflow editor 408 will read the entries in the database server 404 and allows the user to create workflows that are specific to the event type (as defined earlier).

Figure 5:
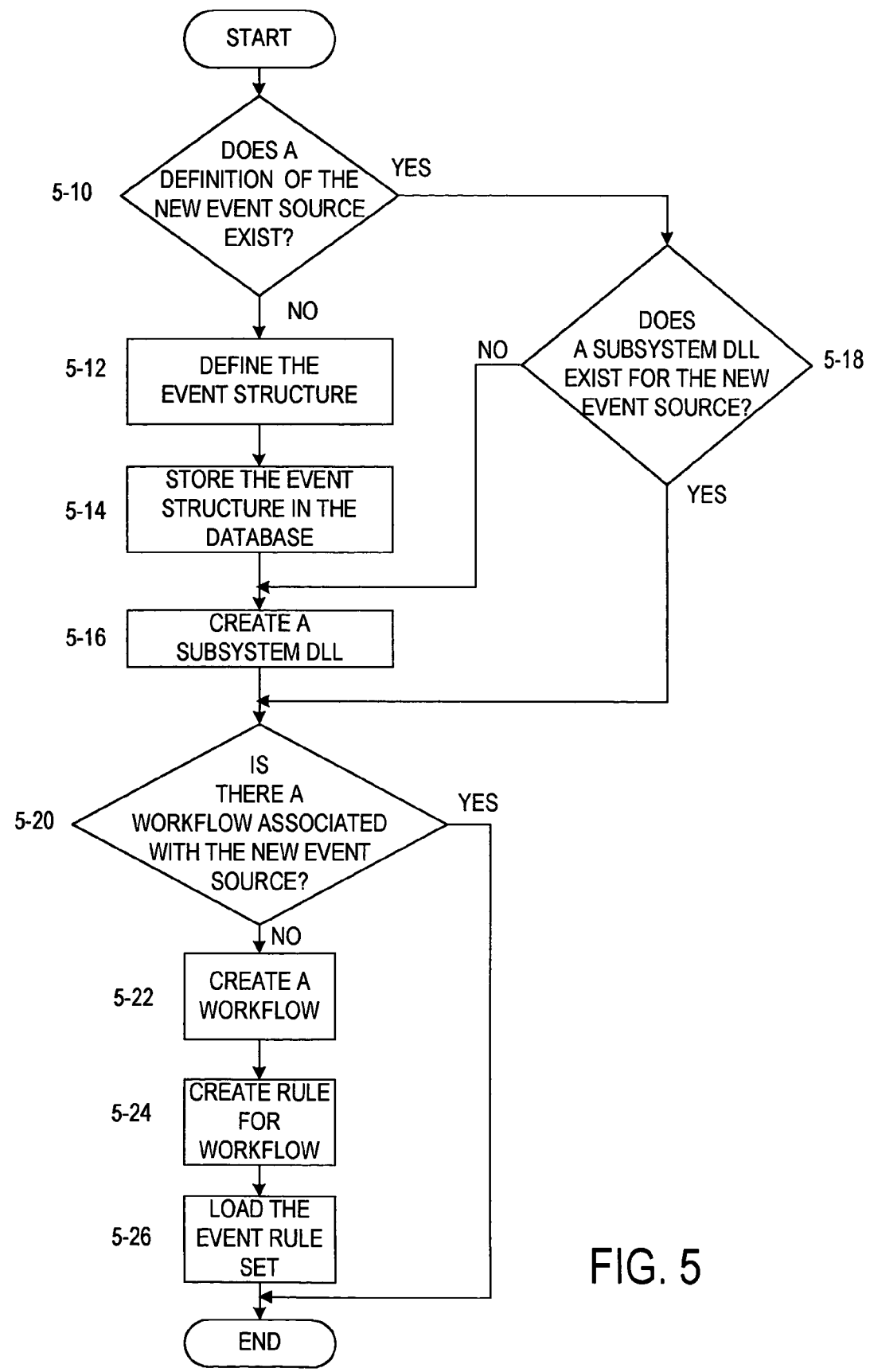
FIG. 5 is a flowchart illustrating one example of a process of adding an event source to a transaction processing system.

FIG. 5 is a flow chart illustrating one example of a process for adding a new event source to a transaction processing system of the present invention. FIG. 5 will be described with respect to an example where a workflow is desired to be executed in response to an event from a new event source "EVENT X" having parameters A, B, and C. The first step 5-10 shown in FIG. 5 asks whether a definition of the new event source exists. If not, an event structure is defined in step 5-12. The event structure can be defined by adding an entry in a table including the EVENT X name and id, and the parameters, A, B, and C. The defined event structure is then stored in the database server 404 at step 5-14.

At step 5-16 a subsystem DLL is created. As mentioned above, the subsystem DLL is designed to create the data structure by taking external events sent to it and to build the event message that will be sent to the workflow server engine 402. The subsystem will also be handling other operations related to the particular external system, for example, a database. If, in step 5-10, a definition already exists, the process proceeds to step 5-18 and asks whether a subsystem DLL exists for the new event source. If not, the process goes to step 5-16. If so, then the process proceeds to step 5-20. At step 5-20, the process asks whether there is a workflow associated with the new event source. If so, the process ends. If not, a workflow is created at step 5-22 using the workflow editor 408. At step 5-24, an event rules is created which is an association of a conditional expression (in terms of event parameters) and a workflow. During the operation of the workflow server, if the conditional expression evaluates to true, the associated workflow is executed. There is also an "always" event rule, so that the associated workflow is always executed when an event of a given type (based on subsystem/event id) is received. Event rules are a part of a set (i.e., an "event rule set"). Therefore, at step 5-26, the event rule set is loaded in order to enable processing of the new event by the workflow server engine. Note that all these steps can be accomplished without changing the core workflow server engine code.

In this example, when EVENT X provides an event to the subsystem DLL, the subsystem constructs the necessary event message and sends it to the workflow server engine 402. The workflow server engine then executes the appropriate workflow.

FIGS. 6 and 7 illustrate workflow servers 400 similar to that shown in FIG. 4, with different examples of extended subsystems 406. In FIG. 6, the subsystems 406 includes user events 428 and versit 430. Versit 430 is a telephony event provider which provides route request events generated by a CTI server. FIG. 6 also shows a CTI server 432 which is connected to the event subsystems 428 and 430. The CTI server 432 generates events for the subsystems 428 and 430. Similarly, FIG. 7 includes subsystem Intelligent Route Administrator (IRA) 434 which is connected to the carrier interface controller (CIC) 436 for generating pre-routing events from an Signaling System 7 (SS7) interface. The CIC 436 interfaces with the PSTN (not shown) for pre-routing by the SS7 interface. Therefore, the embodiment shown in FIG. 7 can be used to get SS7 events.

Following is a more detailed description of how a workflow server engine of the present invention operates. As mentioned above, the invention uses standards-based, components, such as ActiveX controls. This results in a more flexible and efficient workflow server engine, compared to prior workflow server engines which require customized interfaces. An advantage of using standards-based components is that standard development tools, such as Microsoft Visual C++, provide wizards and automated tools to create, extend, and manage ActiveX controls.

Figure 8:
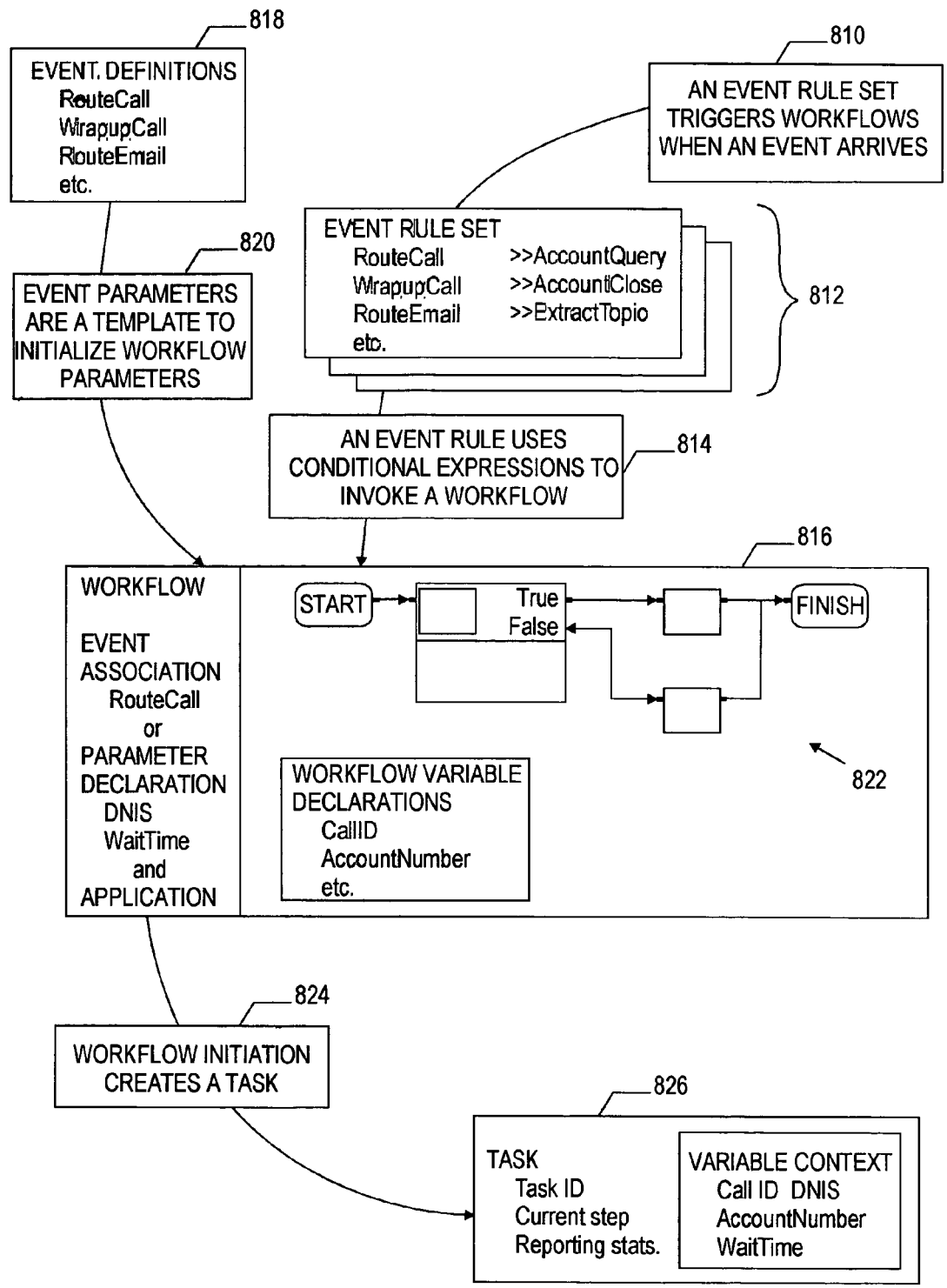
FIG. 8 is a block diagram which illustrates how a workflow is invoked in response to an event in a workflow server of the present invention.

FIG. 8 is a functional block diagram which illustrates how a workflow is invoked in response to an event in an workflow server of the present invention. In the example shown, the workflows are grouped into sets referred to as "event rule sets". This grouping can be accomplished by the workflow administrator via an administrative client. Each set includes workflows bound to certain events. In the case where an event in the set has more than one workflow associated with it, a conditional expression is used to select a workflow for execution from the set of workflows associated with the event. A conditional expression may include event parameters, constants, system defined constants/variables and functions. Details for event rule sets are stored in the file system/database.

On startup, or upon receiving instructions from the workflow administrator, the workflow server engine reads one or more event rule sets and all the workflows associated with the event rule sets into its internal data structures from the database server. As shown in FIG. 8, at step 810, an event rule set triggers one or more workflows when an event notification is received from the event handling subsystem. FIG. 8 shows multiple event rule sets 812 which allows an event to be handled in various modes. For example, in the example of a transaction processing system, multiple event rule sets allows holiday, emergency, and other modes of operation in response to an event. At step 814, the workflow server engine locates and executes a workflow 816 associated to the event by an event rule using a conditional expression as described above. FIG. 8 also shows a list of event definitions 818 which are used to initialize workflow parameters at step 820. Note that the workflow 816 shown in FIG. 8 is merely one example of one possible workflow that may be invoked and that any other desired workflow may also be invoked by various events.

Executing the workflow 816 means traversing the workflow directed graph 822 starting from the Start step and stopping upon encountering the "Finish" step. At step 824, the workflow initiation creates one or more tasks, such as task 826. The path from one step to another is determined by the result of executing the step. At each step, an execution routine (for example, a known method called "Execute") associated with the step is called and the path to a next step is determined form the result of the execution. The Execute method for a step can be a COM method, a DLL function call or function invocation in an EXE using Inter Process Communications (IPC) mechanisms. An example of the pseudo code for an execution algorithm is as follows:

```
WfStep*pStep;
  WfConnectPoint*pConnectPoint;
  for (pStep=GetFirstStep( ); pStep !=NULL; pStep=GetNextStep(pConnectPoint))
  {
  // Execute Step, assuming a single input point to the step
     execute step
  if (success)
  {
  get next output connect point the control flow has transferred to
  }
  else
  {
  signal error
  }
}
```

Figure 9:
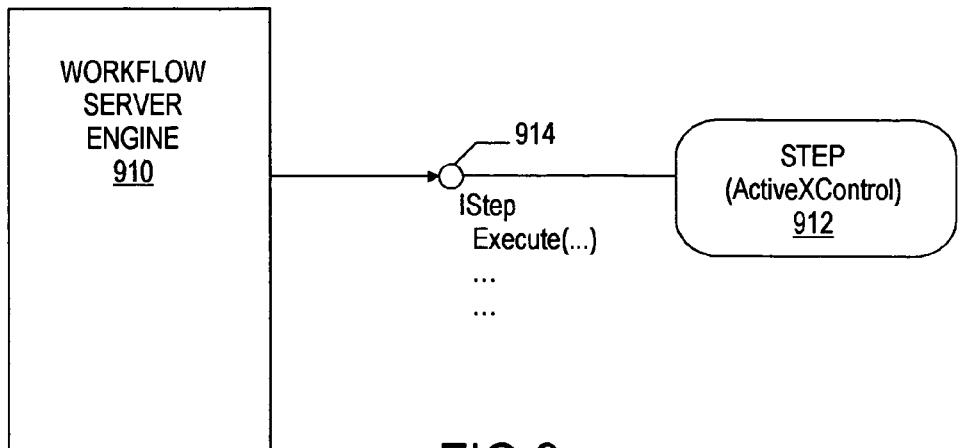
FIG. 9 is a block diagram illustrating how a workflow server engine executes a step implemented using ActiveX controls.

FIG. 9 is a block diagram illustrating how the workflow server engine executes a step implemented using ActiveX controls technology. As mentioned above, the workflow server engine is implemented using standards-based, extensible components. FIG. 9 shows a workflow server engine 910 and a step 912. The workflow server engine 910 is implemented as an ActiveX control container and the step 912 is implemented as ActiveX controls with an additional interface 914 (labeled in FIG. 9 as "IStep") and with at least one method (such as "Execute" mentioned above). Note that there may be other methods in the interface to support the editor and other tools. Also note that the step 912 may include many other interfaces in addition to those shown in FIG. 9.

One feature of the invention is that the invention allows the exchange of events and parameters with other systems (e.g., an application, an agent desktop, a host system, a mainframe, etc.) during a workflow execution. This can be used for server-side scripting of agent desktop rules. To optimize the exchange of information with a wide variety of systems, the execution logic supports different types of event models. This allows different types of events to be handled in different ways. In one embodiment, four types of events are supported including synchronous events, asynchronous events, unsolicited events, and initial events that trigger workflows. According to the nature of the exchange, a workflow developer can choose the optimal event type.

The first event type mentioned above is a synchronous event. In this type of exchange, the workflow engine sends an event to other systems and will wait for the response to come back from the other system before it continues the execution of the workflow. For example, an exchange with a database system usually falls into this category. While waiting for a response from the other system, the workflow server engine will continue to process other workflows. The workflow server engine also releases the worker thread that was processing the workflow task. This reduces the number of threads required in the thread pool and reduces thread context switching overhead. When the response is received, the workflow task is requeued to re-acquire a worker thread. This is an important optimization for a highly responsive system. Sometimes, there may be no response or users want to ignore the response from the other system. In this case, after sending the event, the engine will continue the execution of the workflow.

The second event type mentioned above is an asynchronous event. In an asynchronous exchange, the workflow engine sends an event to other system, and continues the execution of the same workflow. When response is received from the other system, execution will be redirected to the handler of the event. For example, when processing telephony events in a call center environment, the workflow engine can play prompts to the user while waiting for an available agent. When an agent is available, the workflow will stop playing prompt and connect the call to the available agent.

The third event type mentioned above is an unsolicited event. Sometimes, events do not come in a coordinated fashion. For example, a third party system may become unavailable and will therefore fail to respond or provide the proper event information. For example, in a call center environment, a hang-up during a call an example of an unsolicited event. When unsolicited events come in, the workflow engine passes them to the workflows that are currently being executed. The engine will provide the interface for event notification. Other components that are interested in unsolicited events can also make use of that interface. The interface allows other components to notify the engine when an unsolicited event is received, check if an event is available, and retrieve unsolicited events. The user interface (the step) also allows users to specify the following: to ignore a response (send and continue); where to store the responses; and timeout values. The fourth event type mentioned above is initial events that trigger workflows. This type of event is one that is processed by an event rule and that initially causes a workflow to be invoked.

To facilitate message delivery, the same message delivery API described above is used to send and receive messages. For synchronous and asynchronous events, the workflow engine is the event source while the other system is the receiver. For unsolicited events, the events are generated and delivered to the engine through an internal messaging subsystem that is part of the engine implementation.

Another benefit of the present invention relates the ability to add new services in a manner similar to that of new events described above. The invention also provides the ability to communicate with the new services without changing or recompiling the core workflow server engine. This allows for the delivery and extension of multi-tier solutions that are coordinated by a central workflow server engine. This allows support for external database connectivity and support for other services, for example. In addition, the overhead of adding a new service is extremely low. Examples of services that can be added include external database access, repository services, telephony services, Web server request services, email services, etc. Through a high performance messaging utility (described below), services being added can communicate effectively with the rest of the system, including the workflow engine.

A configuration manager will start services according to the configurations stored in a configuration registry in the database. Each service has it own entry in the configuration registry which is created during deployment. For this to happen, the services implement an interface that allows the configuration manager to start, to stop and to query the identity of the service. In one embodiment, the engine assumes no other knowledge about the services. In one embodiment, the loading of services is accomplished through dynamic DLL loading which is part of WIN32 API.

The present invention uses a communications mechanism for integration with the rest of the workflow system. Services are integrated into the rest of the workflow system by communicating with the rest of the system through message passing. Services can communicate with other services, with the workflows in execution and with the engine. A lightweight messaging utility (described below) is available for this purpose. One advantage of this method of message passing is that sender and receiver do not have to bind to any kind of interface. In other words, the sender and receiver do not have to know about each other during compile time.

As mentioned above, the present invention uses a light weight messaging utility to provide a way to communication between services. The messaging utility provides a high performance in-memory mechanism for providing communication between various parts of the system. The messaging utility supports both synchronous and asynchronous types of message passing. In the synchronous mode, the receiving end registers call back functions with the messaging utility. When the message becomes available, the call back functions are triggered and the message is passed through the function call. In the asynchronous mode, the messages are put into message queues for the receiver to retrieve.

Another benefit of the present invention is that it can facilitate real-time management and analysis by tracking and displaying statistical information. To facilitate real-time management and analysis, the execution of workflows is instrumented to collect step execution information. The collected statistics may be made available through an RPC interface. The workflow and consolidation period should be specified through this interface. This feature facilitates monitoring, performance tuning, problem identification, debugging of workflows, and diagnostics in a workflow system. A wide variety of information can be tracked and displayed including workflow execution time, the elapsed time for workflow, step execution time, the number of time a branch is taken, the number of errors which occur in a step, the number of exception occurred, etc. Of course, the present invention allows other desired information to be tracked and/or displayed as well. This information can be tracked and/or displayed during specialized modes of operation (e.g., debugging), as well as during actual use of the workflow.

In one embodiment, the statistics are stored during each step execution of the workflow. If desired, statistics can be consolidated at predefined intervals. A user or system administrator may choose the consolidation periods. In one embodiment, users may configure the system to collect statistics for each workflow at the following intervals: every 5 minutes during the current hour, each hour during the current day, each day during the current week, each week during the current month, etc. As can be seen, statistics may be collected in any manner desired by a user.

To reduce the impact to a system of collecting statistics, certain optimizations may be realized. Following is a description of some optimizations in consolidation. First, a consolidation check occurs at an interval equal to the greatest common factor of all the intervals (e.g., if consolidation intervals are 5 minutes, 1 hour, 1 week, then consolidation occurs every 5 minutes). Second, the engine keeps track of whether new statistics have been added since the last consolidation. If no new data is available, no update is necessary for the current interval. Third, minimized copying is accomplished by using indexing on a circular buffer. In another example of optimization, a high-resolution timer based on a Windows NT performance counter may be used. In this way, time resolution in the nano-second range can be achieved with minimal CPU usage.

As mentioned above, this feature of the present invention may be used to support debugging of workflows. Debugging support may include setting break points or step-by-step debugging with information being displayed for each step. In addition, the execution context is always available to a user. The execution context contains information such as the parameter values, the variable values, etc. which are used in the workflow. A debugging program is used to control the execution of the workflow during a debugging function. The debugging program controls the execution of the workflow through an RPC interface and displays the workflow and the execution context during a debugging session. During a debugging session, the debugging program sends an Open-Debug( )RPC command to the workflow engine. The workflow engine then returns an identifier for the debugging session. This identifier will be used in subsequent commands. The workflow engine also provides the entry point of the workflow to the debugging program so that it can display information accordingly. The present invention allows multiple debug sessions to co-exist in the workflow engine in order to provide flexibility to a user. When a workflow is executed in a debug mode, the workflow engine will suspend its execution after each step. This allows a user to analyze the executed step and view the context information of the step. As mentioned above, the debugging program can query the workflow engine for the execution context, which contains a snapshot of the contents of the variables during the current step. The execution process will resume when the debugging program sends a Step command to the workflow engine. If desired, the debugging program can alter the content of any variables in the execution context. This provides a user with a tool to allow the user to see how the workflow will react to certain values. At any time during a debugging process, the debugging program can terminate the session by issuing a CloseDebug command. The debugging program can also restart the session using the same workflow. This saves the overhead of opening a new debugging session. If desired, statistical information may be used together with debugging information for diagnostic purposes.

Figure 10:
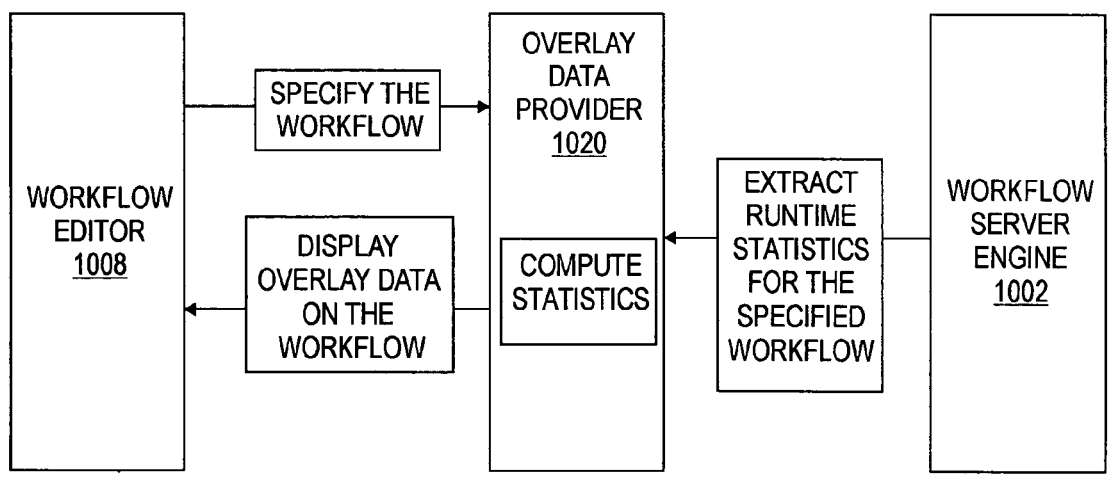
FIG. 10 is a block functional block diagram illustrating the overlay of workflow statistical information onto a workflow diagram.

As mentioned above, the present invention is capable of displaying statistical information relating to a workflow in real-time. In one embodiment, the information that is desired to be displayed is overlaid on top of a workflow diagram displayed on the workflow editor. Of course, the information may be displayed in other ways as well. In on embodiment, there are three main components involved in displaying the overlay data on the workflows. FIG. 10 is a block diagram showing a workflow server engine 1002, a workflow editor 1008, and an overlay data provider 1020. The function of the workflow server engine 1002 is to execute the workflow and gather runtime statistical data relating to each of the workflows currently being executed. The overlay data provider 1020 is connected between the workflow server engine 1002 and the workflow editor 1008 and functions to extract the runtime statistical information for the required workflow from the workflow server engine 1002 and to provide the information to the workflow editor 1008. The workflow editor 1008 displays the workflow and the statistical information. An exemplary process for displaying workflow statistics is shown in FIG. 10 and described below. The first step in the process of displaying workflow statistics is for the workflow editor 1008 to specify the workflow for which information is to be displayed. Next, the workflow server engine 1002 extracts runtime statistics for the specified workflow(s) and sends the information to the overlay data provider 1020. The overlay data provider 1020 computes statistics on per step, per branch, and/or on an overall workflow basis for display on the editor 1008. Finally, the information is overlaid on the appropriate workflow diagram displayed by the workflow editor 1008. In one embodiment, the workflow editor 1008 exposes an overlay interface that can be used by clients (such as the overlay data provider 1020) to display overlay data on the workflow. The editor 1008 does not try to interpret the data, but rather just displays the data at the location specified on the workflow. More details about the workflow server engine and overlay data provider is provided below.

Figure 11:
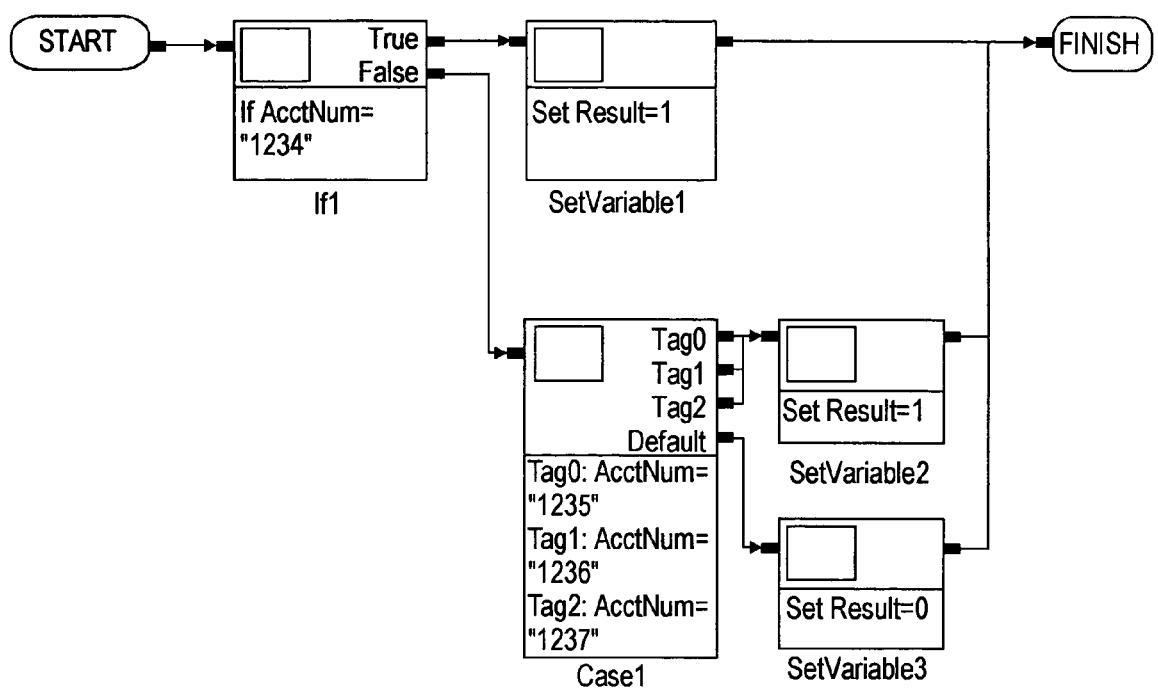
FIGS. 11 and 12 are diagrams of an exemplary workflow illustrating the overlay of statistical data onto a workflow diagram.
Figure 12:
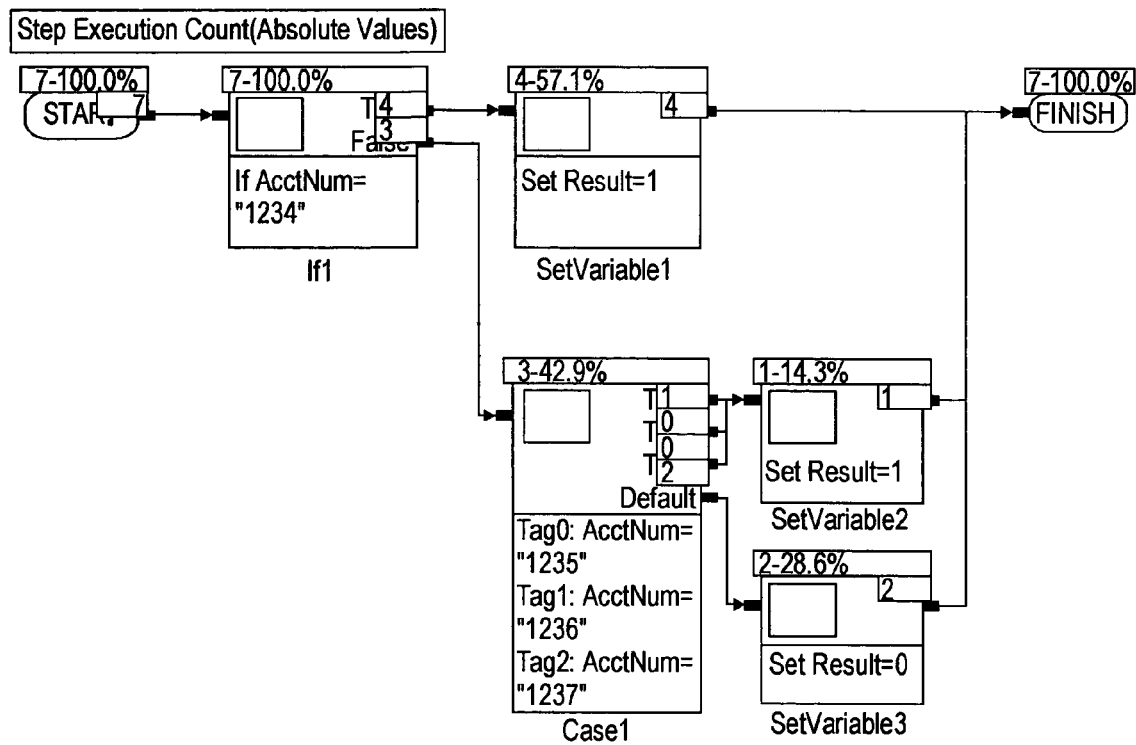

FIGS. 11 and 12 are sample diagrams of an exemplary workflow illustrating the overlay of statistical data onto a workflow diagram. FIG. 11 shows the display of a workflow diagram with no statistical information overlaid. Note that the workflow shown in FIG. 11 is used as an example and that the invention may be applied to various types of displays. FIG. 12 shows the same workflow diagram with statistical information overlaid on the display. The example shown in FIG. 12 demonstrates a sample overlay for the execution count for each step in the workflow. The overlaid information indicates the number of times each step was executed, as well as the percentage of times the workflow followed each branch. For example, the "START" and "FINISH" steps show counts of "7" and that these steps were executed 100% of the time. The first step, Tabled "If1" is shown as being executed 7 times, also 100% of the time. The step "SetVariable1" was executed 4 times and 57.1% of the time (4 out of 7 times). Similarly, the step labeled "Case1" was executed 3 times and 42.9% of the time. The overlay data provided can be absolute values or percentage values. The overlaid information shown in FIG. 12 also shows the counts for each output connection point of each step. For example, for the step "If1", the output connection "TRUE" was executed 4 times while the output connection "False" was executed 3 times. Note that these numbers correspond to the number of times each branch of the workflow is executed. For the step "Case1", of 4 times this branch was executed, the output "Tag0" was executed 1 time and the output "Default" was executed 2 times. The output connections "Tag1" and "Tag2" were not executed in this example.

In addition to displaying numerical values for the statistics, the information can also be displayed in other ways. For example, different color schemes may be used to highlight different bounds or ranges of overlay data. In this case the Editor maintains specifications for highlighting the overlay data with different colors, so that abnormally large/low values or other data ranges can be visually flagged in different ways. The Editor interprets the data provided on its overlay interface only to figure out what data range they fall in and decide about the color to be used to display the overlay data. In one example of a color scheme, red text or background may be used to show the steps executed >50% of the time, blue for the steps executed less than 50%, but greater than 20% of the time, yellow for the steps executed less than 20% of the time, and black for steps that are not executed. Of course this is only an example, as any color scheme could be used. It can be seen that the overlaid information provides a powerful tool for analyzing workflows for many purposes.

In another example, the statistical information may be selectively displayed through the use of a pointing device such as a mouse. The invention allows a user to position a pointer over any step in the workflow. After a predetermined amount of time (e.g., 1 second), a window appears near the pointer displaying the relevant information. For example, if a workflow is displayed such as that shown in FIG. 11, and the user positioned the pointer over the "START" step, the window would appear and show "7-100.0%", or whatever other information it is designed to display. In another example, where information is already overlaid, positioning the pointer will cause more detailed information to be displayed.

As mentioned above, the workflow server engine collects and stores data about the execution of the workflow as well as different steps in the workflow. The workflow server engine exposes an RPC interface for querying the data for a workflow. Clients (e.g., overlay data providers) can query the workflow server engine on this interface to obtain execution data for the specified workflows. The workflow server engine can record a variety of step-by-step metrics as a workflow is executed. In addition to the step metrics, it can record a variety of workflow level metrics as well. A list of sample metrics which may be used by the workflow server engine to record statistical data is shown in Table 1 below.

TABLE 1

METRIC

Total execution time per workflow
Number of timed executions per workflow
Maximum execution time per workflow
Number of executions per workflow
Total execution time per step
Number of timed executions per step
Maximum execution time per step
Maximum execution time of slowest step
Step with slowest execution per workflow.
Number of executions per step
Number of executions per step output branch
Number of events per event type
Number of no binding events per event type
Num. Exceptions/alarms per step
Num. Exceptions/alarms per output branch
Total number of events
Total number of workflow executions
Maximum number of tasks (high-water mark)
Total time number of tasks over licensed limit The overlay data provider is capable of extracting the statistical data, and based on the metrics shown above from the workflow server engine, perform the required calculations and modifications on the data in order to provide the desired data to the editor using the overlay interface. The above mentioned overlay components shield the dependencies from each other. The overlay data provider is the only component that uses the other two components directly. So, it is possible to add different data providers querying different workflow server engines, or manipulating the overlay data from the workflow server engine in different ways and then using the editor to display the overlay.

Note that the statistical information may be displayed in places other than the workflow editor. For example, any device on the network may display information. For example, a system administrator's machine or an agent desktop may display the information described above. Also, in one embodiment, the information may be displayed in a way other than an overlay. for example, the information may be displayed in a table format.

Figure 13:
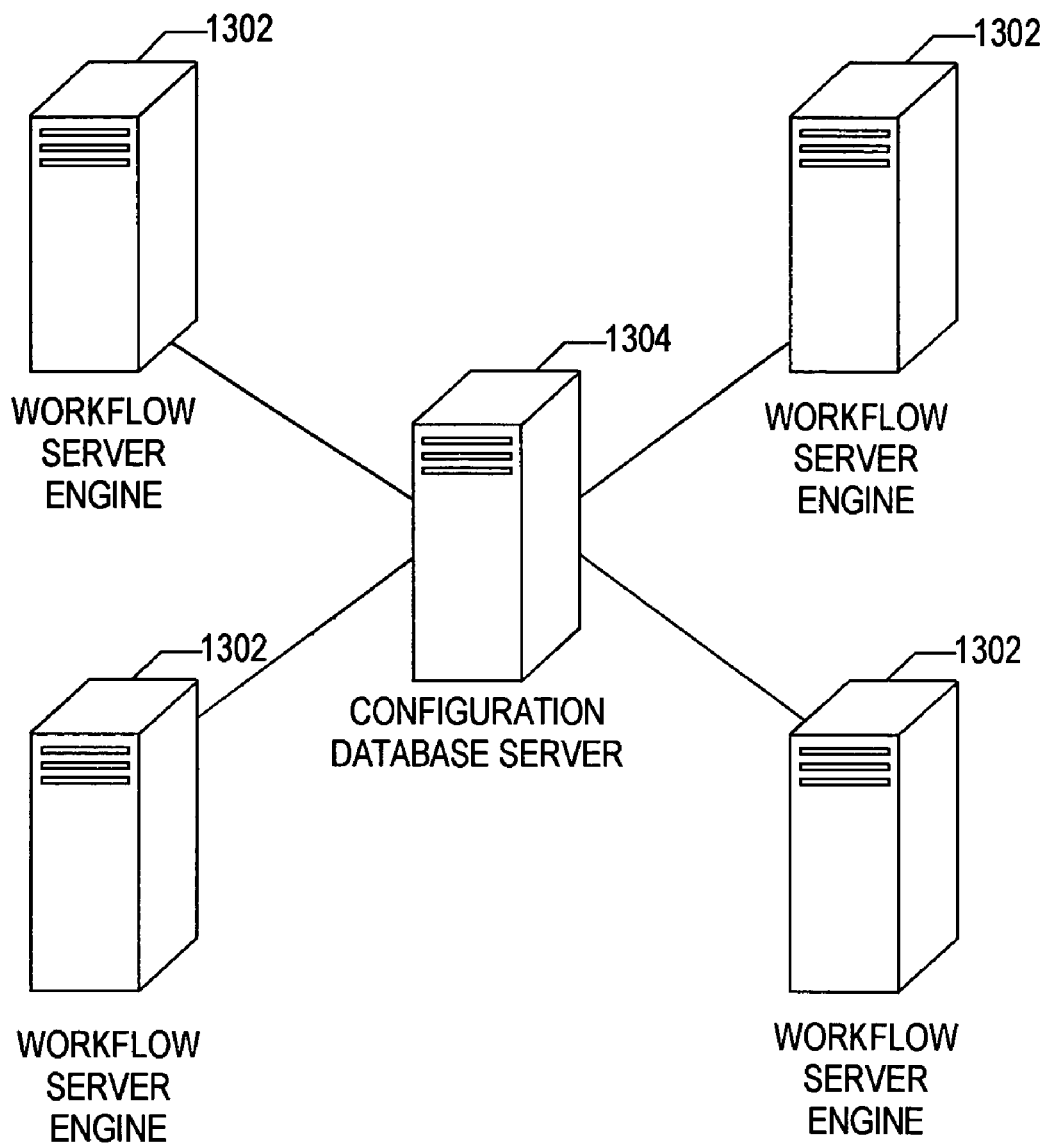
FIG. 13 is a diagram illustrating a centralized configuration database for use with a plurality of workflow server engines.

Another benefit of the present invention is that a central configuration database may be shared by multiple distributed workflow server engines. This provides the advantage of configuring a plurality of workflow server engines in one common place, as opposed to separately configuring a plurality of workflow server engines. FIG. 13 is a diagram illustrating an example where four workflow server engines 1302 share a common configuration database server 1304. In one embodiment, all of the required configuration information needed to start the workflow server engines 1302 and to execute workflows (i.e., all the information required to execute the steps in workflows), is stored in the centralized database server 1304. The database server 1304 is used for storing workflow server engine initialization parameters, workflows, event-to-workflow rule sets, parameters of resources used by the steps during initialization and execution, etc. The use of one single enterprise wide configuration database makes it easier to administer the workflow systems and also makes it easier to present a single unified view of the system. The enterprise may have one or more workflow server engines working off the same configuration database. This allows distribution of load to multiple workflow server engines making it easier to scale up in the case of higher event processing needs. Each workflow server engine is configured to load event rule sets appropriate to process events from event sources attached to that workflow server engine.

One advantage of a centralized database such as the database server 1304 shown in FIG. 13 is that when a user wants to make a change to the configuration of all of the workflow server engines 1302, that change can be made once to the database server 1304. For example, if a user modifies a workflow that is to be used by all of the workflow server engines 1302, the user can make the necessary modifications at the database server 1304 and the changes will be effective for all of the workflow server engines 1302. In the prior art, the changes had to be made separately at the database servers for each of the workflow server engines.

The invention provides a locking mechanism for preventing concurrency control problems. Without this mechanism, it would be possible to make a change to a configuration in the database server 1304, but if a workflow server engine 1302 had already loaded the changed workflow, the loaded workflow would not have the changes. The invention provides a locking mechanism that prevents changes to the database configuration when the components to be changed are in use by one or more of the workflow server engines 1302. In other words, changes to components of the database server 1304 are only allowed when none of the workflow server engines 1302 have that component loaded. In addition, the workflow server engines 1302 are not allowed to load a component while it is being modified. The invention allows some components to be locked down by this mechanisms, while others are allowed to be updated while in use by one or more of the workflow server engines 1302. For example, workflows and rule sets may be chosen to be locked down, while general database access may be allowed.

Another benefit of the present invention is that it facilitates the incremental loading and unloading of workflows and rules. The behavior of an workflow server engine depends on the workflows and rules (event rule sets) which are currently loaded. In the prior art, either all or none of the workflows and rules may be loaded. In contrast, the invention allows applications to be partitioned so that they can be selectively loaded without affecting other applications. The workflow server engine supports dynamic loading and unloading of event-to-workflow rule sets using the workflow administrator. This allows the user of the system to create multiple rule sets to meet the needs of a dynamic business environment. The user may create sets for handling events during very high load or during an unexpected situation. There may be sets for handling events during a holiday or for the situation arising out of the introduction of new products and/or services.

In one embodiment, the workflow server engine maintains a sorted list of currently loaded event-to-workflow rule sets. The latest loaded set is at the top of the list and the earliest loaded set is at the bottom of the list. Upon receiving a workflow event, the engine searches this list from the top for a list of all the workflows bound to that event. The engine proceeds to the next set if no match is found. Otherwise, the conditional expression attached to the first event-to-workflow rule is evaluated. The workflow server engine starts executing the bound workflow if the evaluated condition evaluates to true, otherwise the conditional expression attached to the next rule is evaluated, etc. The workflow server engine proceeds to the next set if the conditional expressions attached to all the rules for a given event in a given set evaluate to false. The workflow server engine allows one or more sets from the list of loaded sets to be unloaded. The unloading may not happen immediately as there may be workflows from the set executing at the time of receiving the instruction. The workflow server engine keeps track of the sets to be unloaded and does not execute workflows from such sets. The workflow server engine removes the sets marked for unloading from its internal data structures once all the workflows in the set finish executing.

Figure 14:
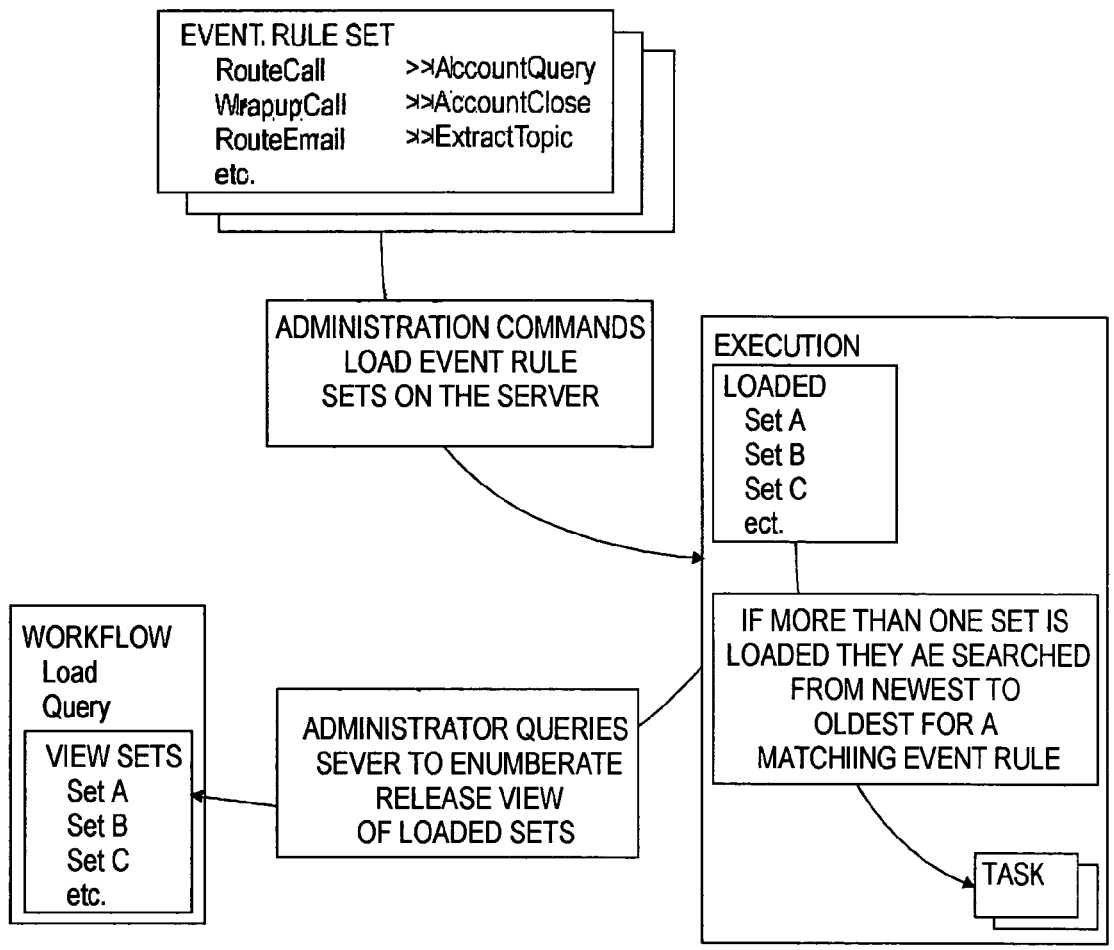
FIG. 14 is a block diagram illustrating the loading and unloading of workflow rule sets.

FIG. 14 is a block diagram illustrating the loading and unloading of workflow rule sets. FIG. 14 shows a plurality of event rules sets. An event rule set consists of one or more event rules. One or more administration commands selectively load the event rules sets on the workflow server engine. FIG. 14 illustrates that more than one event rule set may be actively loaded onto an workflow server engine. If multiple sets are loaded, the sets are searched from newest to oldest for a matching event rules (described above). A match results in a workflow being executed and a one or more tasks being performed. FIG. 14 also illustrates that the administrator can query the workflow server engine to enumerate the loaded sets.

Another benefit the present invention provides is an improved handling of exceptions. A typical prior art workflow system may include error branches, but are very limited. For example, prior art error branches are included in the workflow in every place that an error might be expected. As a result, for many errors, a prior art workflow system just aborts the execution of the workflow. The present invention utilizes an exception handling system which is analogous to some programming languages (e.g., the "on error goto X" command in Visual Basic). The exception handling system of the present invention supports defining exceptions, raising exceptions and handling exceptions at multiple levels (described below). The workflow server engine checks for exceptions after each step and handles any exceptions accordingly.

As mentioned above the invention supports the defining of exceptions. The definitions of exceptions are stored as part of the workflow system configuration so that they are accessible to workflow designs. New definitions can be added to the configuration and used by any components. Following are examples of exceptions that can be handled: database access failures, failure to connect to other services, invalid expressions, etc.

Any steps or services within the workflow system can raise an exception through an API exposed by the workflow engine. The API requires the caller to specify the type of exception, and an optional reason code. A raised exception is placed in a queue and when the current step is done, the workflow server engine will pick up the exception and handle it according to the type of handling specified for that exception.

During the design of a workflow, the user can specify how each exception will be handled by declaring exception handlers. The declaration is accomplished through an OnException step. On this step, users can indicate to ignore an exception, jump to a handler, or end the current workflow immediately. During runtime, as the workflow execution passes each OnException step, the specified handling for an exception will override previous a handling. So, for a particular exception raised, the declaration that is closest to the point of exception will take effect.

Figure 15:
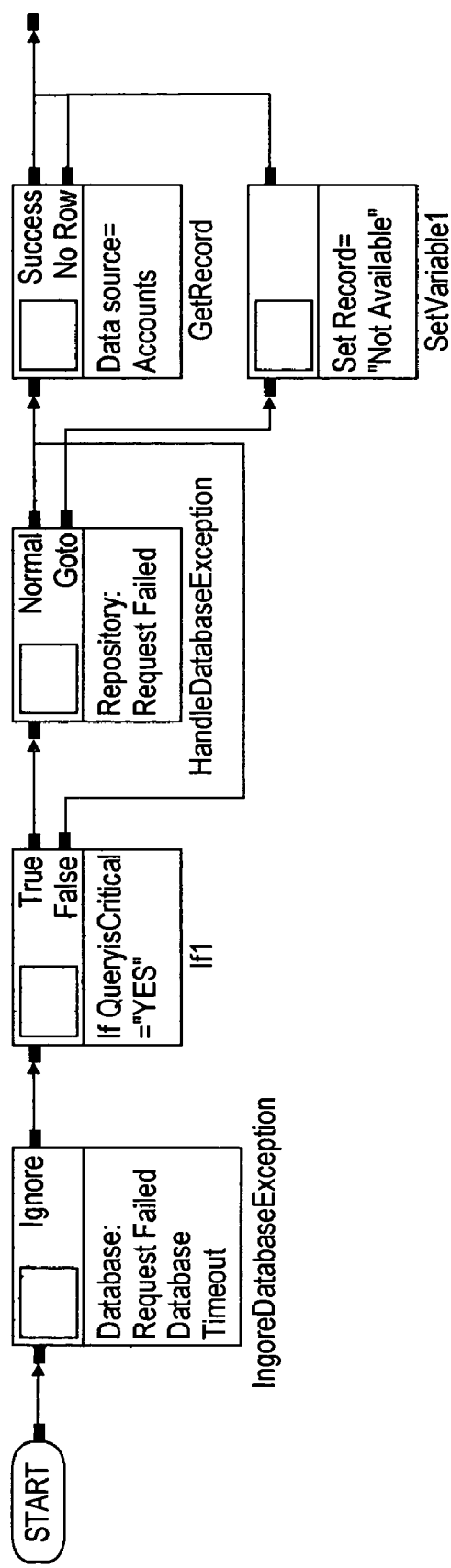
FIG. 15 is a workflow diagram illustrating an exception handling mechanism.

FIG. 15 is an example of a workflow diagram which handles a database exception, for example, if a database access request fails. In this example, the handler of an exception is specified in the OnExecution step (the steps that follow a goto branch of an OnException are the exception handler for the exceptions checked in the OnExecution step). When the workflow shown in FIG. 15 is run, it executes the first OnExecution step, "IgnoreDatabaseException" which specifies the workflow server engine to ignore database exceptions. The next step, "If1" checks the value of a variable called "QueryIsCritical". The purpose of this step is to determine whether the database access exception can be ignored, or if the database access is critical to the workflow. The value of this variable could come from an event source, user input, etc. The second OnException step, "HandleDatabaseException", specifies that when a database exception occurs, goto step "SetVariable1". In this case, the second OnExecution step overrides the first one and if an exception really occurs in the GetRecord step, then execution will goto the SetVariable1 step. Note that the "HandleDatabaseException" step will be executed only if "QueryIsCritical" is set to a value of "YES".

So, if a database exception occurs in the "GetReord" step, and if "QueryIsCritical" is not equal to "YES", then the exception will be ignored since "IgnoreDatabaseException" specifies that handling. However, if "QueryIsCritical" is set to "YES", then the "HandleDatabaseException" step will be executed and it will override the exception declaration of "IgnoreDatabaseException". In that case, the "SetVariable1" step will be executed.

It can be seen that the exception handling technique of the present invention provides great flexibility to a workflow designer and reduces the number of outputs and complexity of a workflow. In addition, the scheme allows dynamic exception handling during runtime. The invention also supports multiple levels. For example, during an exception branch, another exception may occur, which may be handled by another exception branch. In one embodiment, a list of exceptions may be listed in the database and a workflow designer can pick any of these and selectively decide how the handle them or whether to ignore them.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of adding a new event source of a real-time event to a transaction processing system preconfigured to handle a plurality of predetermined real-time events using having a preconfigured workflow server engine without changing the core workflow execution method of the workflow server engine comprising:

defining a new event structure for the new event source of the real-time event in a preconfigured workflow database of the preconfigured workflow server engine, including a plurality of associated event parameters, without modifying the workflow server engine;

creating at least one executable function which creates a new data structure that receives real-time events coming from the new event source and that triggers business rule responses to the events and matches events with associated workflows; and creating a workflow, associated with the new event source, without modifying the workflow server engine to be executed on the workflow server engine as a portion of a business rule response to the events and creating a conditional event rule associated with the workflow, said workflow triggered by the executable function in response to receipt of an event from the event source and configured to return a result to the event source via a callback to enable correction of data structures in response to a workflow failure.

2. The method of claim 1, wherein the event definition includes an event id.

3. The method of claim 2, wherein the created workflow is associated with the event id so that the created workflow is executed in response to any event having the event id.

4. The method of claim 1, wherein the event definition includes a list of parameters associated with the event.

5. The method of claim 1, wherein the at least one executable function is comprised of a dynamic link library, which builds an event message and sends events to the workflow server engine.

6. The method of claim 1, wherein the at least one executable function is designed to send an event to the workflow server engine.

7. The method of claim 1, wherein the event source is added without changing the workflow server engine.

8. The method of claim 1, further comprising creating at least one rule for associating an event from the added event source with the workflow.

9. The method of claim 1 further comprising preventing changes to the workflow database when the changes are to a workflow that is in use by the workflow server engine.

10. The method of claim 8, wherein the event definition includes at least one parameter, and wherein the created at least one rule includes the use of the at least one parameter.

11. The method of claim 1, wherein a plurality of events are defined in the workflow database, the method further comprising categorizing the events into a plurality of event types.

12. The method of claim 11, wherein each of the workflow server engine maintains a sorted list of currently loaded event-to-workflow rule sets and searches the sorted list in order upon receiving a workflow event.

13. A method of adding a new event subsystem to a pre-configured workflow server engine having a plurality of event subsystems for providing events to the workflow server engine, the method comprising:
    defining a new event structure for a defined new real-time event which will be generated by the new event subsystem, including associated event parameters, without modifying the -preconfigured workflow server engine:
    creating a dynamic link library associated with the new event structure for creating a data structure that receives the defined real-time event and sends the event to the workflow server engine and that triggers a business rule response to the defined event; and
    associating the defined event with a new workflow created without modifying the workflow server engine providing the business rule response so that the associated new workflow is executed on the workflow server engine, said workflow triggered by the dynamic link library in response to receipt of an real-time event from the new subsystem and configured to return a result to the new subsystem via a callback to enable correction of data structures in the event of workflow failure.

14. The method of claim 13, wherein the dynamic link library creates a data structure for the defined event.

15. The method of claim 13, wherein defining the event further comprises assigning an event id to the event.

16. The method of claim 13, wherein defining the event further comprises associating a plurality of parameters to the event.

17. The method of claim 16, wherein the plurality of subsystems also have a plurality of associated events.

18. The method of claim 17, further comprising exchanging events between different subsystems during the execution of the workflow.

19. An apparatus for executing a transaction task within a transaction processing system comprising:
    a plurality of event providers for providing a source of real-time events to the transaction processing system;
    a database with a workflow server application program interface that stores information relating to the real-time events provided by the event providers and that triggers a business rule response to the events;
    a workflow server engine for executing workflows providing the business rule responses, said workflows triggered in response to receipt of real-time events from the plurality of event providers and configured to return a result to the event source via a callback to enable correction of data structure in the event of workflow failure;
    and a workflow editor for creating new workflows without modifying the workflow server engine to be executed on the workflow server engine in response to a new event from a new event provider.

20. The method of claim 19, further comprising:
    a new event provider;
    a dynamic link library associated with the new event provider for allowing the new event provider to provide events to the workflow server engine.

21. The method of claim 20, wherein the dynamic link library allows the new event provider to provide events to the workflow server engine without changing the workflow server engine.

22. The method of claim 19, wherein the transaction processing system collects step execution information.

23. The method of claim 19, wherein the collected information includes information relating to the number of times a branch was executed by the workflow server engine.

24. The method of claim 19, wherein the collected information includes information relating to the step execution time for at least one step executed by the workflow server engine.

* * * * *